United States Patent
Darin et al.

(10) Patent No.: US 10,752,415 B2
(45) Date of Patent: Aug. 25, 2020

(54) FLUID POUCH WITH INNER MICROSTRUCTURE

(71) Applicant: HAVI Global Solutions, LLC, Downers Grove, IL (US)

(72) Inventors: Neil Darin, Grayslake, IL (US); Dominic Neisen, Lindenhurst, IL (US); Ralph Hulseman, Greenville, SC (US); Cameron McPherson, Central, SC (US)

(73) Assignee: HAVI Global Solutions, LLC, Downers Grove, IL (US)

( * ) Notice: Subject to any disclaimer, the term of this patent is extended or adjusted under 35 U.S.C. 154(b) by 0 days.

(21) Appl. No.: 15/481,290

(22) Filed: Apr. 6, 2017

(65) Prior Publication Data
US 2017/0291746 A1  Oct. 12, 2017

Related U.S. Application Data

(60) Provisional application No. 62/319,563, filed on Apr. 7, 2016.

(51) Int. Cl.
  *B65D 65/38* (2006.01)
  *B29C 43/02* (2006.01)
  (Continued)

(52) U.S. Cl.
  CPC ............ *B65D 65/38* (2013.01); *B29C 39/026* (2013.01); *B29C 43/021* (2013.01); *B65D 75/58* (2013.01);
  (Continued)

(58) Field of Classification Search
  CPC .... B65D 65/38; B65D 85/72; B65D 75/5877; B65D 75/30; B65D 75/5883; B29C 43/021; B29L 2031/7128
  See application file for complete search history.

(56) References Cited

U.S. PATENT DOCUMENTS

| 2,778,173 A | 1/1957 | Taunton et al. |
| 4,518,643 A * | 5/1985 | Francis ................ B29C 59/022 428/131 |

(Continued)

FOREIGN PATENT DOCUMENTS

| DE | 102008048298 A1 | 5/2010 |
| EP | 932136 A1 | 7/1999 |

(Continued)

OTHER PUBLICATIONS

International Search Report & Written Opinion dated Apr. 13, 2017 for PCT Application No. PCT/US2017/016579 (8 pages).

(Continued)

*Primary Examiner* — David P Angwin
*Assistant Examiner* — Bob Zadeh
(74) *Attorney, Agent, or Firm* — Neal, Gerber & Eisenberg LLP; Kevin A. O'Connor; Daniel Organ

(57) ABSTRACT

Disclosed is a pouch (also called a flexible container) for holding fluid, the pouch including: (a) a first polymeric sheet including a first inner body and a first outer surface, the first inner body including a first inner surface and inner microstructure extending from the first inner surface, the first inner body defining an aerial microstructure surface area density (AMSAD) between 5% and 15%; (b) a second polymeric sheet including a second inner surface and a second outer surface. The second polymeric sheet may be joined with the first polymeric sheet such that the first inner body and the second inner surface form an air-tight fluid chamber therebetween. The second polymeric sheet may lack microstructure extending from the second inner surface. The first inner surface, the first outer surface, the second inner surface, and the second outer surface may be smooth and non-recessed.

4 Claims, 19 Drawing Sheets

(51) Int. Cl.
*B29C 39/02* (2006.01)
*B65D 75/58* (2006.01)
*B29L 31/00* (2006.01)

(52) U.S. Cl.
CPC . *B29L 2031/7128* (2013.01); *B65D 2231/001* (2013.01)

(56) References Cited

U.S. PATENT DOCUMENTS

| | | | |
|---|---|---|---|
| 4,756,422 A * | 7/1988 | Kristen | B65D 31/02 206/524.8 |
| 5,044,642 A | 9/1991 | Vogt et al. | |
| 5,182,069 A | 1/1993 | Wick et al. | |
| 5,728,086 A * | 3/1998 | Niedospial, Jr. | A61J 1/10 604/262 |
| 5,738,671 A | 4/1998 | Niedospial, Jr. et al. | |
| 5,857,275 A | 1/1999 | Deal | |
| 6,331,334 B1 | 12/2001 | Trepte et al. | |
| 6,420,622 B1 | 7/2002 | Johnston et al. | |
| 6,431,695 B1 | 8/2002 | Johnston et al. | |
| 6,534,166 B1 | 3/2003 | Pip et al. | |
| 6,540,949 B2 | 4/2003 | Pip et al. | |
| 6,741,523 B1 | 5/2004 | Bommarito et al. | |
| 6,800,234 B2 | 10/2004 | Ferguson et al. | |
| 6,803,090 B2 | 10/2004 | Castiglione et al. | |
| 6,872,438 B1 | 3/2005 | Allgeuer et al. | |
| 6,946,182 B1 | 9/2005 | Allgeuer et al. | |
| 6,984,278 B2 | 1/2006 | Anderson et al. | |
| 7,137,803 B2 | 11/2006 | Chou | |
| 7,185,453 B2 | 3/2007 | Spear et al. | |
| 7,357,276 B2 * | 4/2008 | Savage | B65D 75/5877 222/92 |
| 7,534,039 B2 * | 5/2009 | Wu | B32B 3/14 383/105 |
| 7,608,160 B2 | 10/2009 | Zhou et al. | |
| 7,703,179 B2 | 4/2010 | Ferguson et al. | |
| 8,153,226 B2 | 4/2012 | Curro et al. | |
| 8,318,284 B2 | 11/2012 | Curro et al. | |
| 8,440,286 B2 | 5/2013 | Curro et al. | |
| 8,448,530 B2 | 5/2013 | Leuenberger et al. | |
| 8,460,568 B2 | 6/2013 | David et al. | |
| 8,486,319 B2 | 7/2013 | Victor et al. | |
| 8,590,193 B2 | 11/2013 | Licha | |
| 8,720,047 B2 | 5/2014 | Hulseman et al. | |
| 8,784,713 B2 | 7/2014 | Victor et al. | |
| 8,814,954 B2 | 8/2014 | Hulseman et al. | |
| 8,900,651 B2 | 12/2014 | McClain et al. | |
| 8,926,782 B2 | 1/2015 | Zhou et al. | |
| 9,119,450 B2 | 9/2015 | Lee et al. | |
| 9,120,670 B2 | 9/2015 | Hulseman et al. | |
| 9,238,309 B2 | 1/2016 | King et al. | |
| 9,303,322 B2 | 4/2016 | Victor et al. | |
| 9,517,122 B2 | 12/2016 | Firstenberg et al. | |
| 9,526,640 B2 | 12/2016 | Bertolino et al. | |
| 2001/0007682 A1 | 7/2001 | Chiu et al. | |
| 2002/0114920 A1 | 8/2002 | Scholz et al. | |
| 2003/0006535 A1 * | 1/2003 | Hennessey | B29C 59/04 264/403 |
| 2004/0050948 A1 | 3/2004 | Bartels | |
| 2005/0003146 A1 * | 1/2005 | Spath | A63C 5/04 428/105 |
| 2005/0189314 A1 | 9/2005 | Carbone | |
| 2006/0005362 A1 | 1/2006 | Arzt et al. | |
| 2006/0121248 A1 | 6/2006 | Lorenz et al. | |
| 2006/0214380 A1 | 9/2006 | Dietle et al. | |
| 2007/0025648 A1 * | 2/2007 | Micnerski | B65D 75/5877 383/66 |
| 2007/0241515 A1 | 10/2007 | Sato et al. | |
| 2008/0199110 A1 | 8/2008 | Anderson et al. | |
| 2009/0065141 A1 | 3/2009 | Kerber | |
| 2009/0082856 A1 | 3/2009 | Flanagan | |
| 2009/0121383 A1 | 5/2009 | Jagota et al. | |
| 2009/0146336 A1 | 6/2009 | Masi | |
| 2009/0184175 A1 | 7/2009 | Blankenstein et al. | |
| 2009/0233041 A1 | 9/2009 | Rasmussen | |
| 2010/0096408 A1 | 4/2010 | Schiewe et al. | |
| 2010/0129608 A1 | 5/2010 | Low et al. | |
| 2010/0308497 A1 | 12/2010 | David | |
| 2010/0320111 A1 | 12/2010 | Maier | |
| 2011/0266724 A1 | 11/2011 | Hulseman et al. | |
| 2011/0282284 A1 | 11/2011 | Kriesel et al. | |
| 2011/0311764 A1 | 12/2011 | Hulseman et al. | |
| 2012/0009387 A1 | 1/2012 | Wang et al. | |
| 2012/0052241 A1 | 3/2012 | King et al. | |
| 2012/0126458 A1 | 5/2012 | King et al. | |
| 2012/0136304 A1 * | 5/2012 | Wyss | A61J 1/1475 604/151 |
| 2013/0101791 A1 | 4/2013 | Hitschmann et al. | |
| 2013/0216712 A1 | 8/2013 | Merz | |
| 2014/0147629 A1 | 5/2014 | Tanaka et al. | |
| 2014/0200679 A1 | 7/2014 | Bluecher et al. | |
| 2014/0270599 A1 | 9/2014 | Farhat et al. | |
| 2014/0276494 A1 | 9/2014 | Cisko et al. | |
| 2014/0318657 A1 | 10/2014 | Bixler et al. | |
| 2014/0343687 A1 | 11/2014 | Jennissen | |
| 2015/0122846 A1 | 5/2015 | Stanley et al. | |
| 2015/0140309 A1 | 5/2015 | Pricone | |
| 2015/0175329 A1 | 6/2015 | Wilke et al. | |
| 2015/0209846 A1 | 7/2015 | Aizanberg et al. | |
| 2015/0209999 A1 * | 7/2015 | Stone | A61F 13/15731 264/280 |
| 2015/0298378 A1 | 10/2015 | Hulseman et al. | |
| 2015/0298379 A1 | 10/2015 | Hulseman et al. | |
| 2015/0307773 A1 | 10/2015 | Hulseman et al. | |
| 2015/0327645 A1 | 11/2015 | Lee et al. | |
| 2015/0328815 A1 | 11/2015 | Hulseman et al. | |
| 2015/0368838 A1 | 12/2015 | Hulseman et al. | |
| 2016/0052177 A1 | 2/2016 | Chauvin et al. | |
| 2017/0014111 A1 | 1/2017 | Hulseman et al. | |
| 2017/0095019 A1 | 4/2017 | Milbocker et al. | |

FOREIGN PATENT DOCUMENTS

| | | |
|---|---|---|
| RU | 2390324 | 5/2010 |
| WO | 2014152477 A1 | 9/2014 |
| WO | 2014154659 A1 | 10/2014 |
| WO | 2015057053 A1 | 4/2015 |
| WO | 2015069857 A1 | 5/2015 |

OTHER PUBLICATIONS

International Search Report & Written Opinion dated Aug. 7, 2017 for PCT Application No. PCT/US17/26435 (12 pages).
International Search Report & Written Opinion dated Aug. 28, 2017 for PCT Application No. PCT/US2017/0390085 (11 pages).
3M, 3M Griping Material, Brochure, 2011 pp. 1-8, 3M, USA.
Gravish et al., Frictional and Elastic Energy in Gecko Adhesive Detachment, Journal of the Royal Society Interface, 2007, pp. 1-10, FirstCite e-publishing.
Barquins, Sliding Friction of Rubber and Schallamach Waves—A Review, Materials Science and Engineering, 1985, 45-63, vol. 73.
Bico et al. Rough Wetting, IOP Science, Journal article, Jul. 15, 2001, pp. 214-220, vol. 55, Europhysics Letters.
Autumn et al., Evidence for Van Der Waals Adhesion in Gecko Setae, PNAS, Sep. 17, 2002, 12252-12256, vol. 99, USA.
Metin Sitti et al., Syntehtic Gecko Foot-Hair Micro/Nano-Structures As Dry Adhesives, J. Adhesion Sci. Technol., vol. 17, No. 8, pp. 1055-1073 (2003).
Majidi et al., Attachment of Fiber Array Adhesive Through Side Contact, Journal of Applied Physics, 2005, pp. 103521-103521-5, vol. 98, California.
Majidi et al., High Friction from A Stiff Polymer Using Microfiber Arrays, Physical Review Letters Aug. 18, 2006, pp. 076103-076103-4 vol. 97, USA.
Kustandi et al., Fabrication of a Gecko-like Hierarchical Fibril Array Using a Bonded Porous Alumina Template, Journal of Micromechanics and Microengineering, Sep. 5, 2007, pp. N75-N81, vol. 1 IOP Publishing.
Lee et al., Directional Adhesion of Gecko-Inspired Angled Microfiber Arrays, Applied Physics Letters, Nov. 13, 2008, pp. 191910-1-191910-3, vol. 93, American Institute of Physics, USA.

(56) References Cited

OTHER PUBLICATIONS

Autumn, Gecko Adhesion: Structure, Function, and Applications, MRS Bulletin, Jun. 2007, pp. 473-478, vol. 32.
Murphy et al., Gecko-Inspired Directional and Controllable Adhesion, Small, 2009, pp. 170-175, No. 5, Wiley-VCH Verlag GmbH & Co. KGaA, Weinheim.
Autumn et al., Gecko Adhesion: Evolutionary Nanotechnology, Phil. Trans. R. Soc. A, Jan. 11, 2008, pp. 1575-1590, vol. The Royal Society.
Mahdavi et al., A Biodegradable and Biocompatible Gecko-Inspired Tissue Adhesive, PNAS, Feb. 19, 2008, pp. 2307-2312, vol. 105 No. 7.
Forsberg et al., Contact Line Pinning on Microstructured Surfaces for Liquids in the Wnezel State, Langmuir Article, 2010, pp. 860-865, 26(2), American Chemical Society.
Ben-David et al., The Dynamics of the Onset of Frictional Slip, Science Mag., Oct. 8, 2010, pp. 1-7, vol. 330, AAAS.
Ben-David et al., The Dynamics of the Onset of Frictional Slip, Science Mag., Oct. 8, 2010, pp. 210-214, vol. 330, AAAS.
Zappwei et al., Looking At How Things Slip, Science Mag., Oct. 8, 2010, pp. 184-185, vol. 330, AAAS.
Y.M Park et al. Artificial Petal Surface Based on Hierarchical Micro- and Nanostructures, Thin Solid Films, Jul. 18, 2011, pp. 362-367, vol. 520, Elsevier B.V. South Korea.
Labonte et al., Surface Contact and Design of Fibrillar 'Friction Pad' in stick insects (*Carausius morosus*): Mechanisms for large Friction Coefficients and Negligible Adhesion, J. R. Soc. Interface, Jan. 27, 2014, pp. 1-13, vol. 11.
Tsipenyuk et al., Use of Biomimetic Hexagonal Surface Texture in Friction Against Lubricated Skin, J. R. Soc. Interface, Feb. 18, 2014, pp. 1-6, vol. 11.
Tian et al., Adhesion And Friction In Gecko Toe Attachment And Detachment, PNAS, Dec. 19, 2006, pp. 19320-1932, vol. 103 No. 51.
Barquins, Friction and Wear of Rubber-Like Materials, 1993, pp. 1-11, Elsevier Sequoia, France.
Ebert et al., Wear-Resistant Rose Petal Effect Surfaces with Superhydrophobicity and High Droplet Adhesion Using Hydrophobic and Hydrophilic Nanoparticles, Journal of Colloid and Interface Science, Jul. 4, 2012, pp. 182-188, USA.
Chen et al., Bio-Mimetic Mechanisms of Natural Hierarchical Materials: A Review, Journal of the Mechanical Behavior of Biomedical Materials, Nov. 17, 2012, pp. 3-33, vol. 19, Elsevier Ltd.
Liu et al., Bio-Inspired Superoleophobic and Smart Materials: Design, Fabrication, and Application, Progress in Materials Science, Nov. 15, 2012, pp. 503-564, vol. 58, Elsevier Ltd.
Lee et al., Directional Adhesion of Gecko-Inspired Angled Microfiber Arrays. Applied Physics letters, Nov. 13, 2008, pp. 191910-1-191910-3, vol. 93, American Institute of Physics.
Schubert et al., Towards Friction and Adhesion From High Modulus Microfiber Arrays, J. Adhesion Sci. Technol., Aug. 8, 2007, pp. 1297-1315, vol. 21 No. 12-13. VSP.
Cannon et al., Extrusion of Low Friction and Low Tack Microstructured Surfaces on Silicone Rubber, Oct. 9-11, 2012, pp. 1-10.
Autumn et al., Effective Elasstic Modulus of Isolated Gecko Setal Arrays, The Journal of Experimental Biology, Jun. 5, 2006 pp. 3558-3568, vol. 209, The Company of Biologists.
Autumn et al., Frictional Adhesion: A New Angle on Gecko Attachment, The Journal of Experimental Biology, Aug. 11, 2006, pp. 3569-3579, vol. 209, The Company of Biologists.
Zhao et al., Adhesion and Friction Force Coupling of Gecko Setal Arrays: Implications for Structured Adhesive Surfaces, Langmuir, 2008, pp. 1517-1524, vol. 24, The American Chemical Society.
Liu et al., Bio-Inspired Design of Multiscale Structures for Funtion Integration, Nano Today, Mar. 5, 2011, pp. 155-175, vol. 6, Elsevier Ltd.
Autumn et al., Adhesive Force of A Single Gecko Foot-hair, Nature, Jun. 8, 2000, pp. 681-685, vol. 405, Macmillan Magazines Ltd.
Machalek, Porcupine Quills, Gecko Feet and Spider Webs Inspire Medical Materials, National Institute of General Medical Sciences, Mar. 6, 2013, pp. 1-2.
Schallamach, How Does Rubber Slide?, Wear, Dec. 12, 1970, pp. 301-312, vol. 17, Elsevier Sequoia.
Qu et al., Carbon Nanotube Arryas with Strong Shear Binding-On and Easy Normal Lifting-Off, Science Mag., Oct. 10, 2008, pp. 238-242, vol. 322, AAAS.
Liu et al., A New Generation High-Drag Proppant: Prototype Development, Laboratory Testing, and Hydraulic Fracturing Modeling, SPE International, Feb. 2015, pp. 1-5, Society of Petroleum Engineers.
Pugno, Spiderman Gloves, Nano Today, Oct. 2008, pp. 35-41, vol. 3, Elsevier Ltd.
Ramesh et al., Friction Characteristics of Microtextured Surfaces Under Mixed and Hydrodynamic Lubrication, Tribology International, Aug. 7, 2012, pp. 170-176, vol. 57, Elsevier Ltd.
Villacorta et al., Viscoelastic Computational Modeling of Extruded Micro-Textured Polymeric Films, Procedia Materials Science, 2014, pp. 1460-1465, vol. 5, Elsevier Ltd.
U.S. Appl. No. 62/291,833.
U.S. Appl. No. 62/319,563.
U.S. Appl. No. 62/355,081.
U.S. Appl. No. 62/372,896.

\* cited by examiner

FLUID POUCH WITH INNER MICROSTRUCTURE

PRIORITY CLAIM

This application claims priority to U.S. Provisional Patent Application No. 62/319,563 (filed on Apr. 8, 2016), which is hereby incorporated by reference in its entirety.

TECHNICAL FIELD

This application relates to pouches for storing fluids.

BACKGROUND

Sealed plastic pouches are used to store a range of liquids, fluids, or semi-fluids (referred to as "fluids") such as syrup for soft drinks, laundry detergent, orange juice, paint, soap, glue etc. These sealed pouches may include a port. A user opens the port and connects a tube to the opened port (or if no port exists, then the user may puncture the pouch with the tube). The other end of the tube links to a pump. The pump extracts the fluid from the pouch and directs the fluid to a dispenser (e.g., a soda-fountain, a nozzle, etc.). A pump is not necessary. The fluid may be squeezed out of the pouch by air pressure on the exterior of the pouch or by gravity.

Pouches typically include a top flexible sheet joined with a bottom flexible sheet. Fluid occupies space between the top and bottom sheets. The pump and/or the port prevents ambient air from replacing pumped fluid. Thus, as the pump extracts fluid from the pouch, the top and bottom sheets wrinkle and the space between the top and bottom sheets shrinks.

Once the space between the top and bottom sheets has shrunk to a certain extent and a sufficient number of wrinkles have been introduced, the pump can no longer extract fluid from the pouch. The pouch is now obsolete. The user discards the obsolete pouch and attaches a fresh pouch. Fluid remaining in the obsolete pouch is wasted. Many existing pouches become obsolete with 20% or more of the original mass of fluid remaining.

Accordingly, there is a need for new pouches with properties that delay obsolescence until a greater amount of the original fluid has been extracted.

SUMMARY

Various embodiments of the present disclosure solve the above problems by providing a pouch for holding fluid, the pouch including: (a) a first polymeric sheet including a first inner body and a first outer surface, the first inner body including a first inner surface and inner microstructure extending from the first inner surface, the first inner body defining an aerial microstructure surface area density (AMSAD) between 1% and 15%; (b) a second polymeric sheet including a second inner surface and a second outer surface.

The second polymeric sheet may be joined with the first polymeric sheet such that the first inner body and the second inner surface form an air-tight fluid chamber therebetween. The second polymeric sheet may lack microstructure extending from the second inner surface. The first inner surface, the first outer surface, the second inner surface, and the second outer surface may be smooth and non-recessed.

Some embodiments of the disclosed pouch enable 99% mass extraction of stored fluid via some or all of the above-described techniques including extraction via a pump, via air pressure on the exterior of the pouch, or via gravity.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
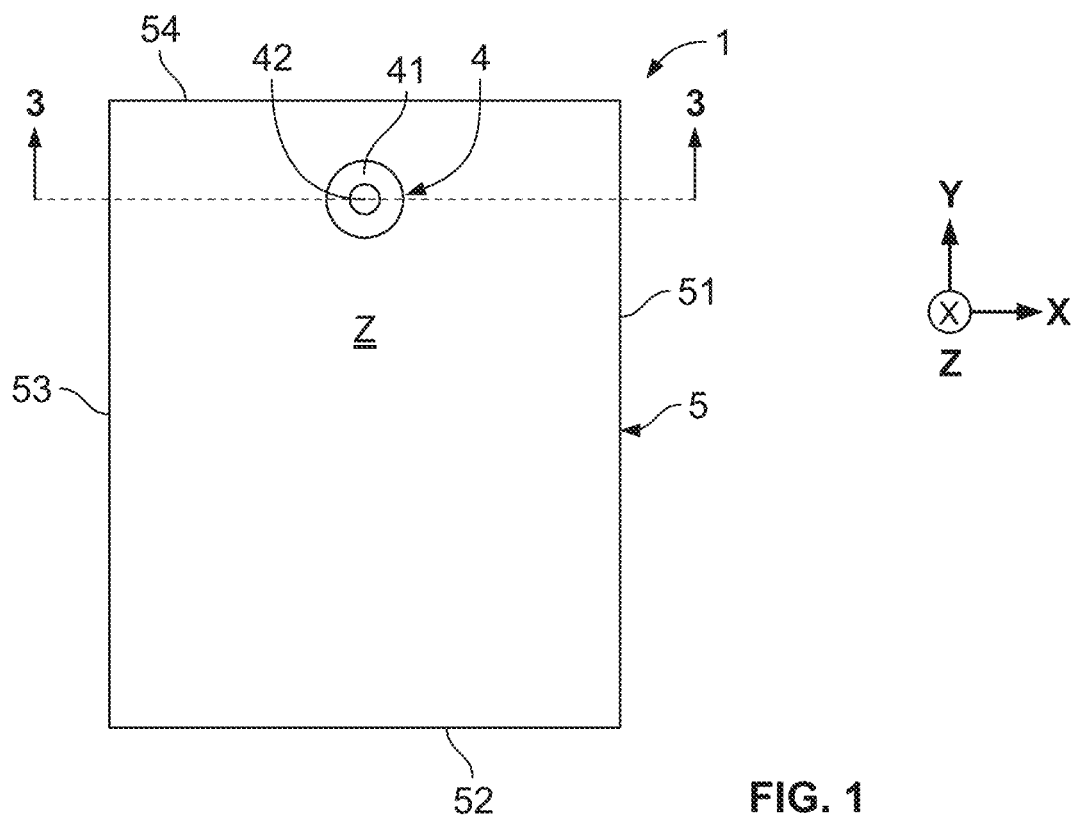
FIG. 1 is a top plan view of a first pouch.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present, as one option, and mutually exclusive alternatives as another option. In other words, the conjunction "or" should be understood to include "and/or" as one option and "either/or" as another option. The claims may include dimensions and numeric values. It should be appreciated that such dimensions and numeric values are approximate unless otherwise stated. Approximate includes a tolerance of ±10%.

Figure 2:
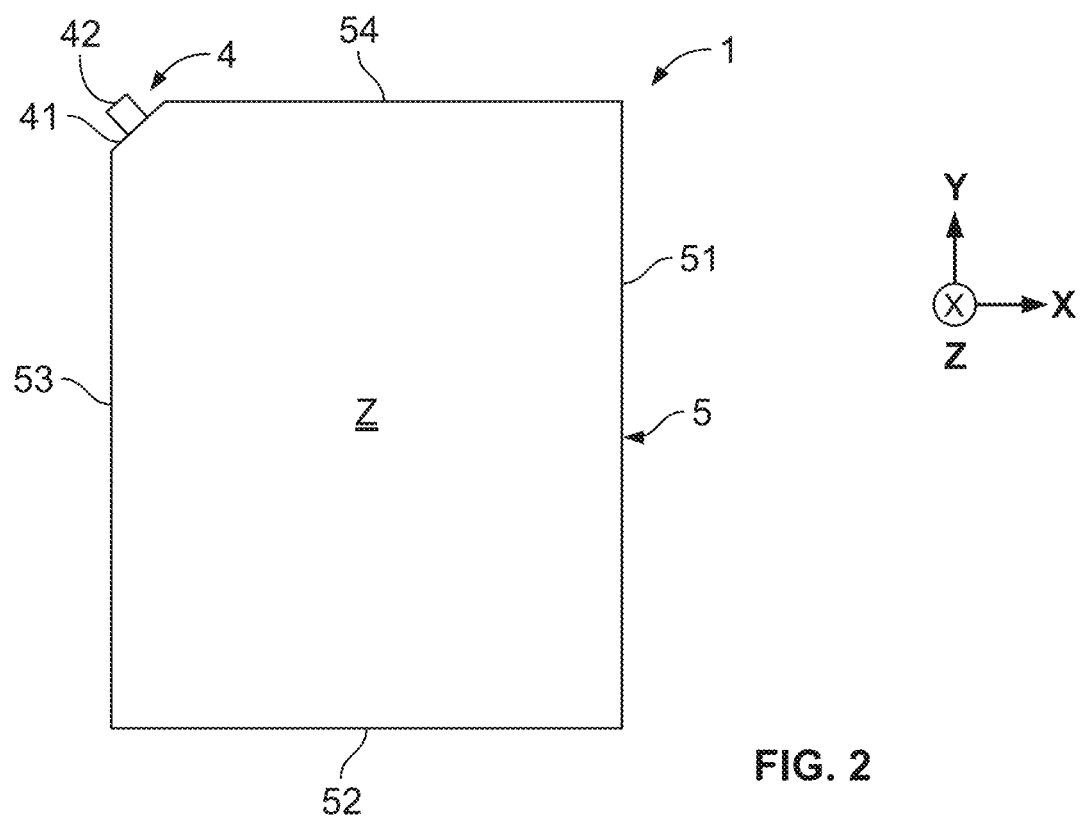
FIG. 2 is a top plan view of a second pouch.
Figure 4:
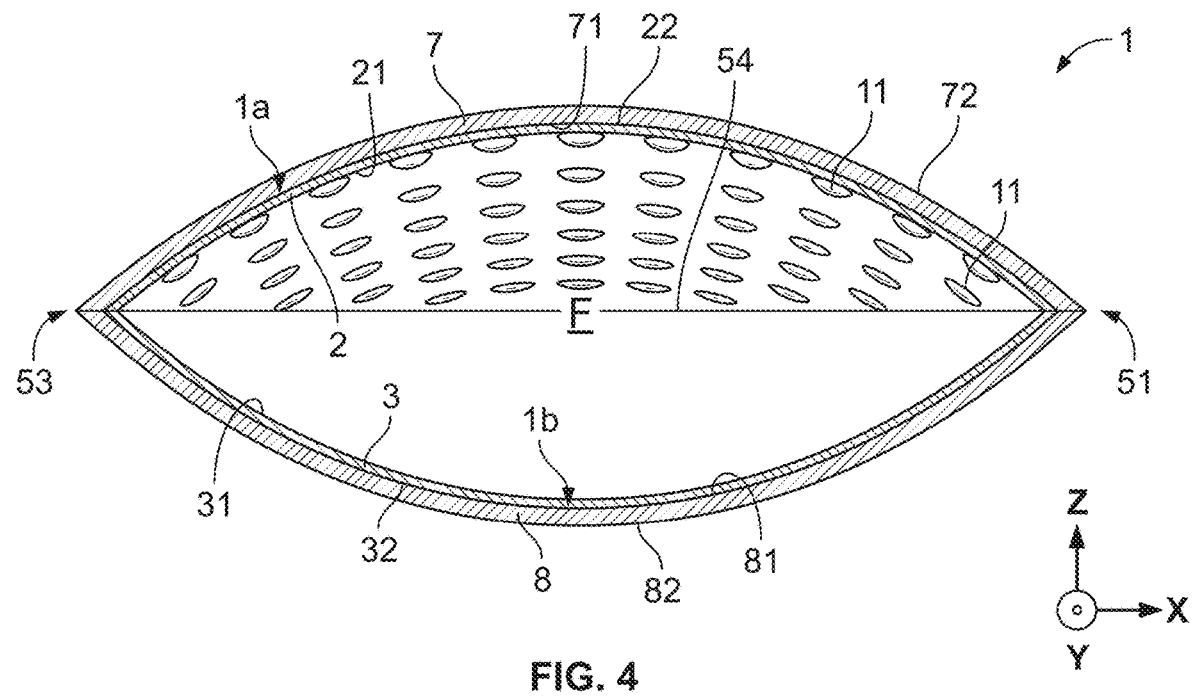
FIG. 4 is a second possible cross sectional view of the first pouch.

FIGS. 1, 2, and 4 are schematic top plan views of a pouch 1 (also called a flexible container) consistent with the present disclosure. Pouch 1 may be configured to intake, store, and expel a gas, liquid, fluid, or semi-fluid (referred to as "fluid"). Pouch 1 may include a first or top sheet 2, a second or bottom sheet 3, a port 4, and microstructure 11. As with all features disclosed herein, port 4 is optional. Pouch 1 can be polymeric, laminated, or coated. Pouch 1 can be organic (e.g., paper) with polymeric microstructure coated onto the organic material (i.e., the sheets). Any features discussed with reference to pouch 1 can be applied to a bag, sachet, or tote liner.

First or top sheet 2 may be heat sealed to second or bottom sheet 3 about an outer perimeter 5 of pouch 1. Top sheet 2 and bottom sheet 3 may be rectangular or any other geometric shape (e.g., circular, oval-shaped, etc.). In FIGS. 1, 2 and 4, top sheet 2 and bottom sheet 3 are rectangular. Thus, outer perimeter 5 includes a right side 51, a front side 52, a left side 53, and a back side 54. Top sheet and bottom sheet 3 may have the same or different lengths, widths, and thicknesses. Pouch 1 can be made from a single sheet of material, folded onto itself and sealed along its outer edges. In this case, the single sheet could be thought of as including a top sheet 2 and a bottom sheet 3. Pouch 1 can include 2, 4, or 6 sides/sheets. As such, outer perimeter 5, instead of being an interface between top sheet 2 and bottom sheet 3, may include separate sheets. For example, right side 51, front side 52, left side 53, and back side 54 may all be separate individual sheets, each joined with top sheet 2 and bottom sheet 3.

Port 4 may include a base 41 and a conduit 42. Base 41 may have a greater outer diameter than conduit 42. Port 4 may be connected to top sheet 2, bottom sheet 3, or both sheets. FIG. 1 shows port 4 being connected to top sheet 2. FIG. 2 shows port 4 being connected to both of top sheet 2 and bottom sheet 3. FIG. 4 shows port 4 being connected to bottom sheet 3. Port 4 may be connected to top and/or bottom sheets 2, 3 in any suitable manner. As one example, a hole may be cut in top sheet 2. An outer diameter of base 41 may be sealed, via heat treatment, to the portions of sheet 2 defining the hole. Although not shown, conduit 42 may include an on-off valve.

Figure 3:
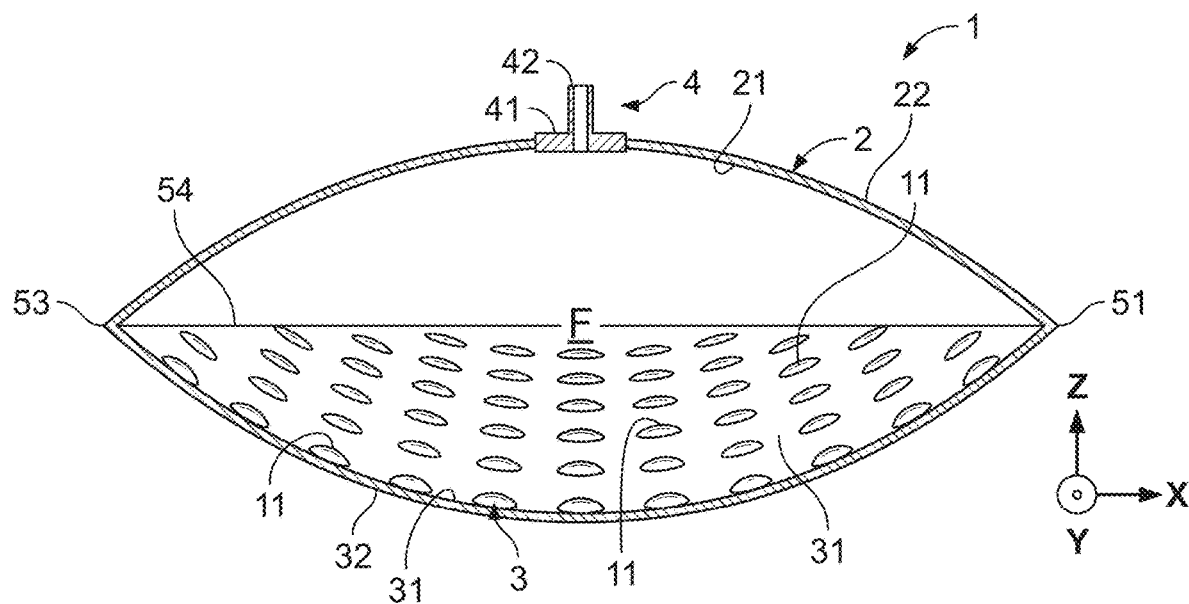
FIG. 3 is a first possible cross sectional view of the first pouch taken along line 3-3 of FIG. 1.

FIG. 3 is a schematic cross sectional view taken along line 3-3 of FIG. 1. As shown in FIG. 3, bottom sheet 3 may include microstructure 11 (also called micropattern 11). Top sheet 2 may not include microstructure. Fluid F may occupy an inner void defined between top sheet 2 and bottom sheet 3.

With continued reference to FIG. 3, top sheet 2 may include an inner surface 21 and an outer surface 22. Bottom sheet 3 may include an inner surface 31, an outer surface 32, and microstructure 11 inwardly protruding from inner surface 31. Inner surfaces 21, 31 may be smooth. Similarly, outer surface 22, 32 may be smooth. Back side 54 of perimeter 51 may be visible in cross section. A combination of inner surface 31 and microstructure 11 is referred to as a bottom inner body (not labeled). A combination of inner surface 21 and microstructure 11 is referred to as a top inner body (not labeled).

Although FIG. 3 shows microstructure 11 extending from inner surface 31 of bottom sheet 3, it should be appreciated that microstructure 11 may extend alternatively or in addition from inner surface 21 of top sheet 2. According a preferred embodiment, microstructure 11 only extends from one of top sheet 2 and bottom sheet 3. It was surprisingly found that when only one of top sheet 2 and bottom sheet 3 include microstructure 11, fluid extraction from pouch 1 is improved for reasons discussed below. Put differently, when only one of top sheet 2 and bottom sheet 3 include microstructure 11, a greater amount of fluid in pouch 1 may be extracted before pouch 1 becomes obsolete.

As shown in FIG. 4, pouch 1 may include a top protective layer 7 and a bottom protective layer 8. The top protective layer 7 may be a sheet with an inner surface 71 and an outer surface 72. Similarly, the bottom protective layer 8 may be a sheet with an inner surface 81 and an outer surface 82. Inner surface 71 of top protective layer 7 may be affixed to outer surface 22 of top sheet 2 via any suitable method (e.g., glue, heat treatment, etc.) to form a top interface 1a. Similarly, inner surface 81 of bottom protective layer 8 may be affixed to outer surface 32 of bottom sheet 3 via the above methods to form a bottom interface 1b. According to other embodiments (not shown), top protective layer 7 may be only affixed to top sheet 2 along perimeter 5 and bottom protective layer 8 may only be affixed to bottom sheet 3 along perimeter 5. Pouch 1 may include any number of protective layers. Some of these layers may be rigid (e.g., cardboard). Some may be organic (e.g., cotton).

Figure 5:
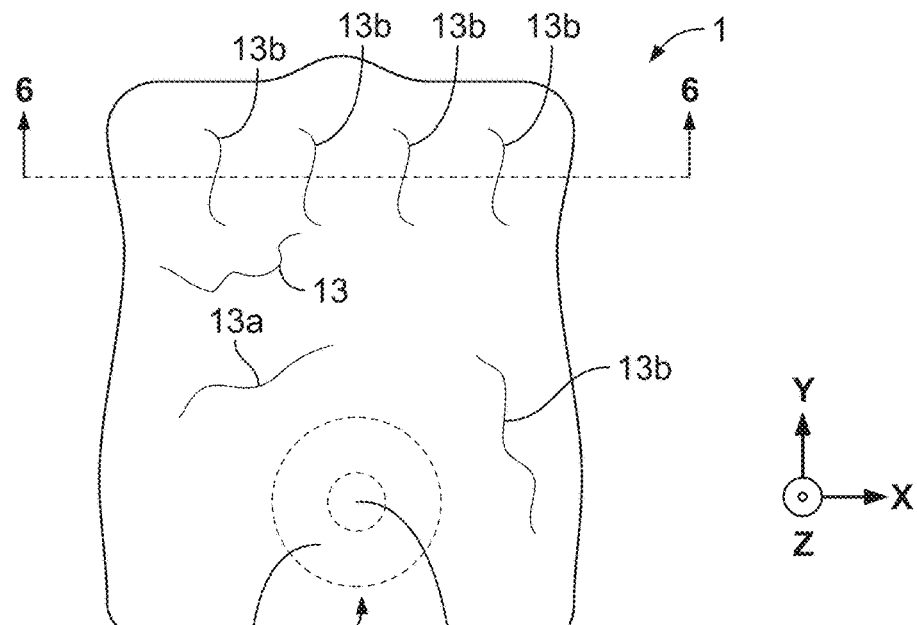
FIG. 5 is a top plan view of a third pouch after vacuum extraction of a first amount of fluid.

With reference to FIG. 5, a large amount of fluid has been pumped or extracted from pouch 1. Because pouch 1 is sealed, ambient air cannot replace extracted fluid. As a result, top sheet 2 and bottom sheet 3 now include wrinkles 13. Wrinkles 13 may include contact wrinkles 13a where top sheet 2 touches bottom sheet 3. Wrinkles 13 may include non-contact wrinkles 13b, where top sheet 2 and bottom sheet 3 are close together, but not in contact.

Figure 6:
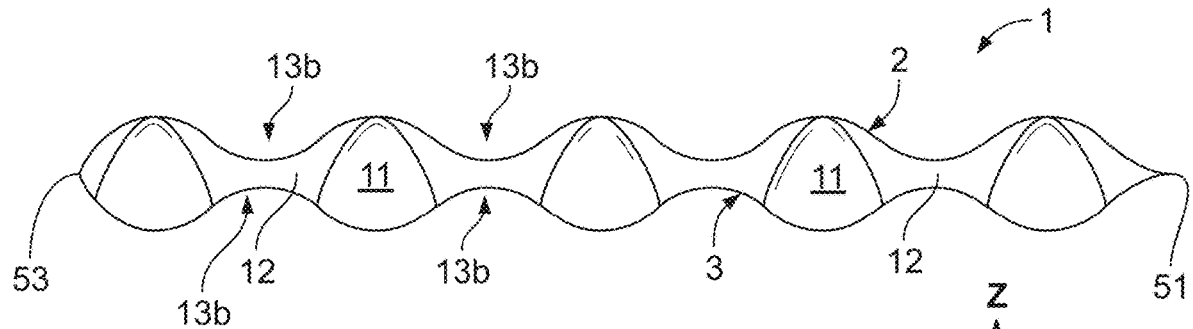
FIG. 6 is a cross sectional view of the third pouch taken along line 6-6 of FIG. 5.

FIG. 6 is a schematic cross sectional view taken along line 6-6 of FIG. 4 after a first amount of fluid (e.g., 90%) has been pumped from pouch 1. As shown in FIG. 5, microstructure 11 discourages contact wrinkles 13a in favor of non-contact wrinkles 13b. More specifically, microstructure 11 serve as pillars separating top sheet 2 from bottom sheet 3. Fluid flow paths 12 are defined in between adjacent microstructure 11.

Figure 7:
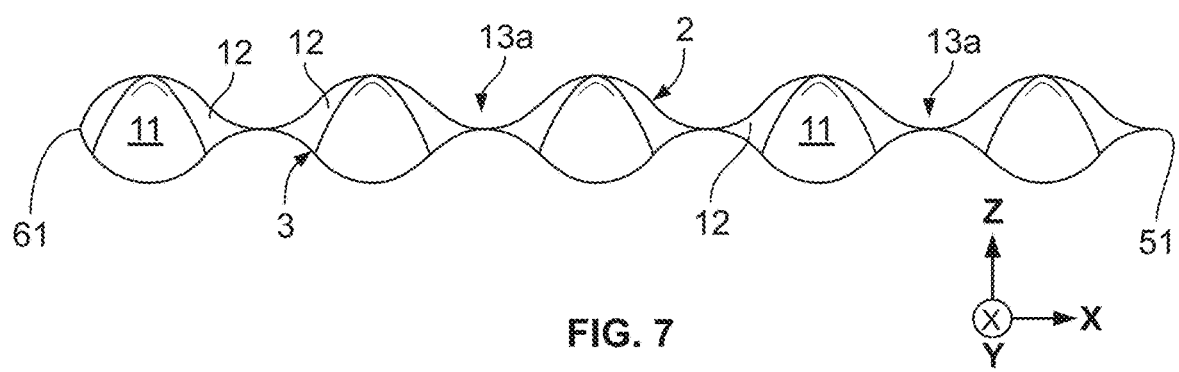
FIG. 7 is a cross sectional view of the third pouch after vacuum extraction of a greater second amount of fluid.

FIG. 7 is a schematic cross sectional view taken along line 6-6 of FIG. 4 after a greater second amount of fluid (e.g, 92%) has been pumped from pouch 1. Although some contact wrinkles 13a have formed, microstructure 11 has reduced their width. As a result, fluid flow paths 12 are defined between contact wrinkles 13a and microstructure 11.

The disclosed embodiments do not guarantee 100% fluid extraction from pouch 1 before obsolescence. The disclosed embodiments, however, enable a greater percentage of fluid to be extracted before obsolescence, compared with existing pouches. As an illustrative example, one embodiment of pouch 1 may enable a certain capacity pump to extract 99% of fluid (e.g., soft-drink syrup) before obsolescence while an existing pouch may only allow the same capacity pump to only extract 70% of the same fluid before obsolescence.

Figure 8:
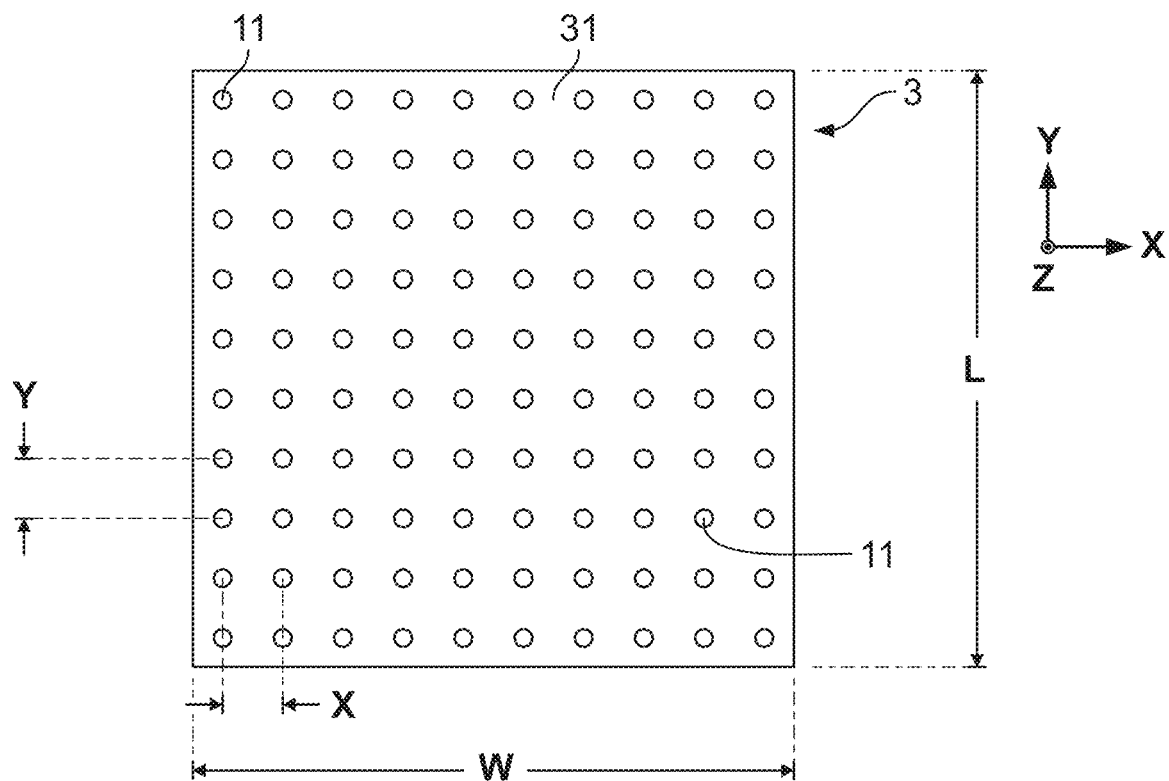
FIG. 8 is a top plan view of a sheet of any of the disclosed pouches. The sheet includes first microstructure.

FIG. 8 is a top plan view of inner surface 31 of bottom sheet 3. Inner surface 31 includes microstructure 11. As previously discussed, top sheet 2 may include microstructure 11 alternatively or in addition to bottom sheet 3. As previously discussed, port 4 may be affixed to either top sheet 2 or bottom sheet 3. It should thus be understood that any description related to microstructure 11 may apply to top sheet 2 and/or bottom sheet 3. Similarly, any description of bottom sheet may additionally or alternatively apply to top sheet 2.

Figure 12:
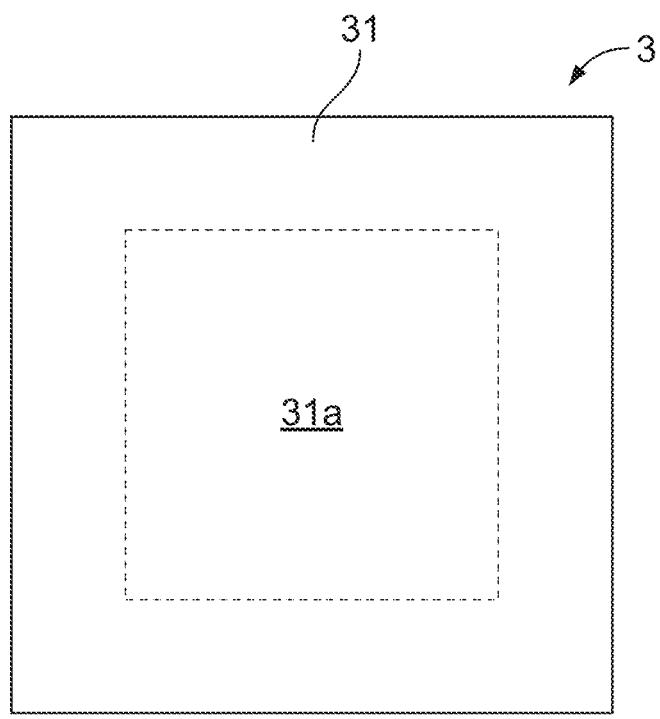
FIG. 12 is a top plan schematic of the sheet of FIG. 8.
Figure 13:
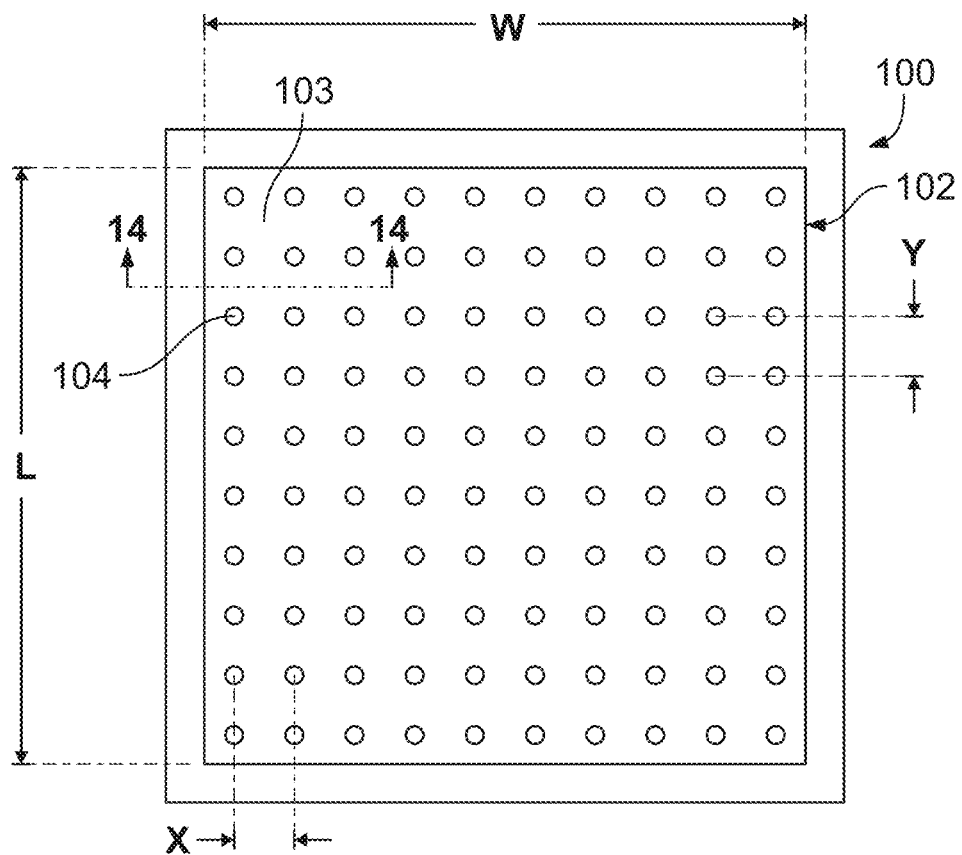
FIG. 13 is a top plan view of a mold for making the sheet of FIG. 8.
Figure 14:
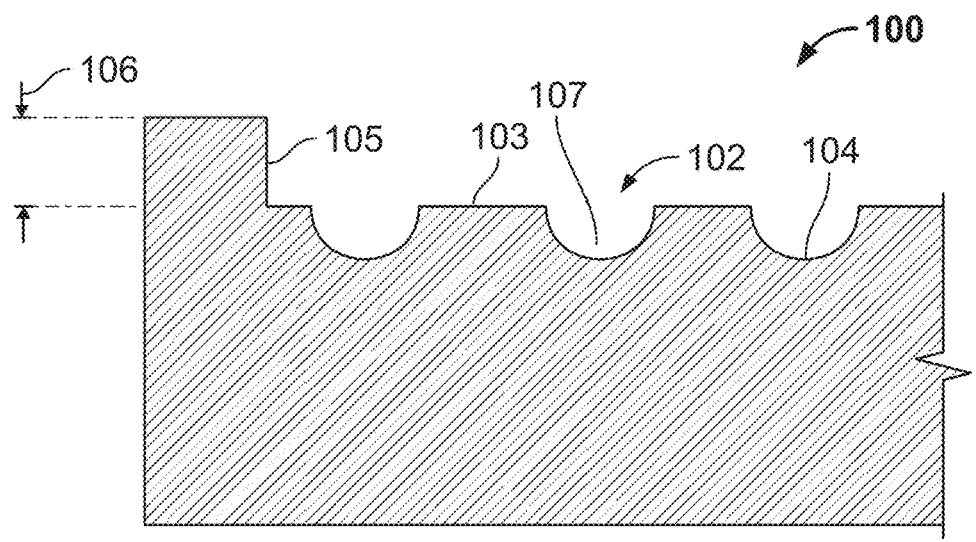
FIG. 14 is a front elevational view of the mold taken along line 14-14 of FIG. 13.

With reference to FIG. 8, bottom sheet 3 may include a length L, a width W, and a thickness T. Microstructure 11 may be arranged in a array with rows and columns. According to preferred embodiments, the array of microstructure 11 may extend across all of inner surface 31. Alternatively, and as shown in FIG. 12, the array of microstructure 11 may be confined to a central section 31a of inner surface 31.

Returning to FIG. 8, a first pitch X separates centers of adjacent microstructure 11 in the width dimension. A second pitch Y separates centers of adjacent microstructure 11 in the length dimension. First pitch X may be equal to second pitch Y. Inner surface 31 may include a smooth surface area, representing the total surface area of inner surface 31 without microstructure 11 and a microstructure surface area, representing the total surface area of microstructure 11.

Figure 9:
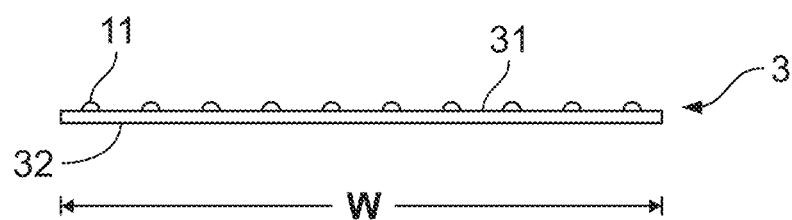
FIG. 9 is a front elevational view of the sheet of FIG. 8.
Figure 10:
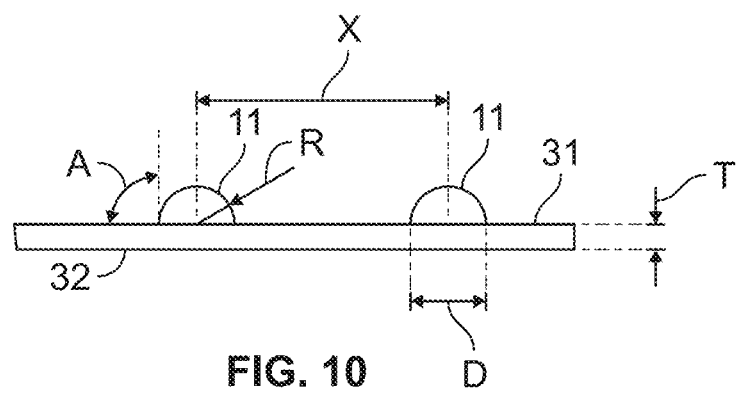
FIG. 10 is an enlarged front elevational view of the sheet of FIG. 8.
Figure 11:
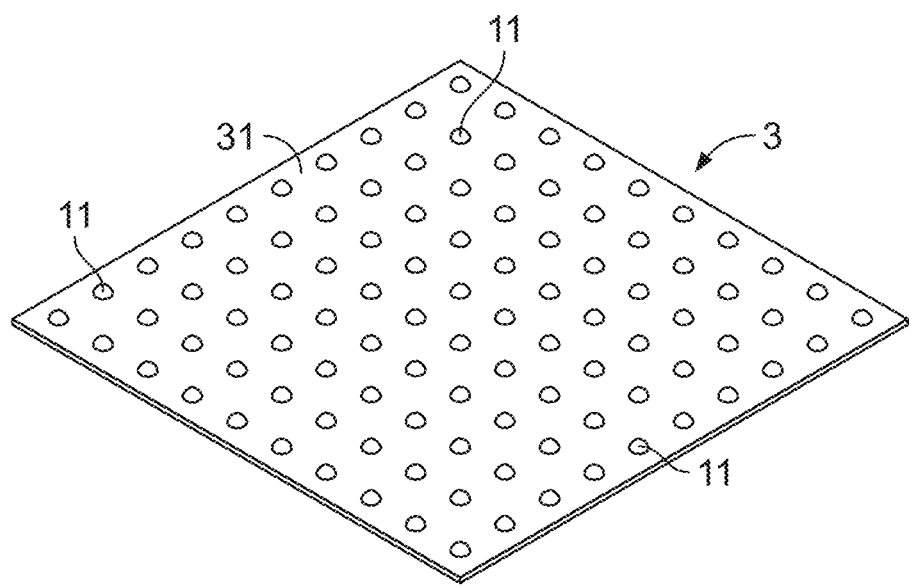
FIG. 11 is an isometric view of the sheet of FIG. 8.

With reference to FIGS. 9 and 10, microstructure 11 may be semicircular with a radius R and diameter D=2*R. Microstructure 11 may form a contact angle A with respect to inner surface 31. If the array extends across all of the inner body, the surface area of inner surface 31 is: $W*L-(total\ number\ of\ microstructure\ 11)*(pi*R^2)$. The total number of microstructure 11 is approximately: $W/X*L/Y$. If first pitch X and second pitch Y are equal, then the total number of microstructure 11 is approximately: $(W*L)/X^2$.

Bottom sheet 3 includes an aerial microstructure surface area density (AMSAD), which is: [(total surface area of microstructure, when viewed from a top plan perspective)/(total surface area of the inner body, when viewed from a top plan perspective)]. An example top plan perspective is shown in FIG. 8.

Thus, the AMSAD of bottom sheet 3 is approximately: $[(R^2*pi)*(the\ total\ number\ of\ microstructure\ 11)]/[W*L] = [R^2*pi*W*L]/[X^2*W*L] = [R^2*pi]/[X^2]$. It was surprisingly discovered that a smaller AMSAD improves fluid evacuation from pouch 1. More specifically, an AMSAD between the range of 1% to 21% counter-intuitively performs better than an AMSAD of less than 1% or greater than 21%. Thus, according to preferred embodiments, bottom sheet 3 has an AMSAD of between 5% and 15% or 5% to 9%.

According to preferred embodiments, bottom sheet 3 has a thickness T of 0.057 to 0.1 mm, and microstructure 11 has a radius of 0.10 to 0.20 mm, a first pitch X of 0.8 mm to 1.2 mm, a second pitch Y of 0.8 mm to 1.2 mm and a contact angle A of 88 to 107 degrees. According to one of these preferred embodiments, microstructure 11 has a radius of 0.15 mm, a first pitch of 1 mm, a second pitch of 1 mm, and a contact angle of 90 degrees. According to the same embodiment, bottom sheet 3 has an AMSAD of approximately 7%. According to these preferred embodiments, the total volume of microstructure 11 is 5 to 21% of the total volume of bottom sheet 3 excluding microstructure 11.

In some examples, a change in contact angle may alter the effectiveness of the microstructure. An experiment was run using four microstructures having different contact angles. Bags including microstructures with each respective contact angle were filled with liquid and evacuated. Then a percent evacuated based on weight before and after was measured for each bag/contact angle. The results are shown in Table 1. As can be seen, a relationship between contact angle and percent evacuated can be used to select an appropriate microstructure.

TABLE 1

| Test | Contact Angle | Percent Evacuated |
| --- | --- | --- |
| 1 (control) | 84.25 | 56.68 |
| 2 | 158.98 | 61.78 |
| 3 | 147.88 | 76.93 |
| 4 | 137.91 | 81.99 |

According to some embodiments, bottom sheet 3 and/or top sheet 2 have a thickness T of 12 microns to 600 microns or 2.5 mm.

Although AMSAD was described with reference to the length and width of bottom sheet 3, it should be appreciated that in cases where microstructure 11 only occupies a central portion 31a of bottom sheet 3, the relevant length and width in the AMSAD calculation are the length and width of central portion 31a (assuming central portion 31a is rectangular, which need not be the case) or the multiple central portions 31a (if multiple central portions 31a exist).

The especially preferred embodiment of bottom sheet 3 was tested with a stable Newtonian syrup having a resting viscosity ranging from 20 centipoise to 65 centipoise at 21 degrees Celsius. A pouch 1 was formed from bottom sheet 3, including microstructure 11, and a smooth top sheet 2. Both bottom sheet 2 and top sheet 3 had a length and width of 10.16 cm. Half of the volume of pouch 1 was filled with the stable Newtonian syrup. A rigid tube was inserted 2.54 cm into pouch 1 and the interface between pouch 1 and the rigid tube was sealed. Via the rigid tube, pouch 1 was subject to a vacuum of 84.66 kilo-Pascals. After sixty seconds of vacuum, only 0.70% of the original mass of the stable Newtonian syrup remained in pouch 1. The same test was performed with a pouch without microstructure. After sixty seconds of vacuum, 37.97% of the original mass of the stable Newtonian syrup remained in the pouch.

It should thus be appreciated that disclosed embodiments of pouch 1 enable at least 95, 96, 97, 98, and 99% mass extraction of a stable Newtonian syrup having a resting viscosity ranging from 20 centipoise to 65 centipoise at 21 degrees Celsius when subject to a vacuum pressure of at least 84 kilo-Pascals for sixty seconds.

For improved structural integrity and fluid extraction performance, bottom sheet 3 may be manufactured via a hot re-flow molding process instead of an embossing process. The process may be a cured fluid process, where curing happens via heat, solvent loss, light, or other chemical reactions.

More specifically, and with reference to FIGS. 13 to 16, a mold 100 includes an inner perimeter wall 105 and a bottom walls 103, 104. Bottom walls 103, 104 include a flat and smooth base wall 103 and interspersed smooth well walls 104. The combination of inner perimeter wall 105 and bottom walls 103, 104 defines an inner recessed area 102. Inner recessed area 102 has a length and width equal to the desired length L and width W of bottom sheet 3. Inner perimeter wall 105 has a thickness 106. Well walls 104 define semi-circular recesses 107 having geometry identical to microstructure 11. As with all features disclosed herein, inner perimeter wall 105 is unnecessary. No perimeter wall may be present and the film, post-curing, may be trimmed to the desired size.

Figure 15:
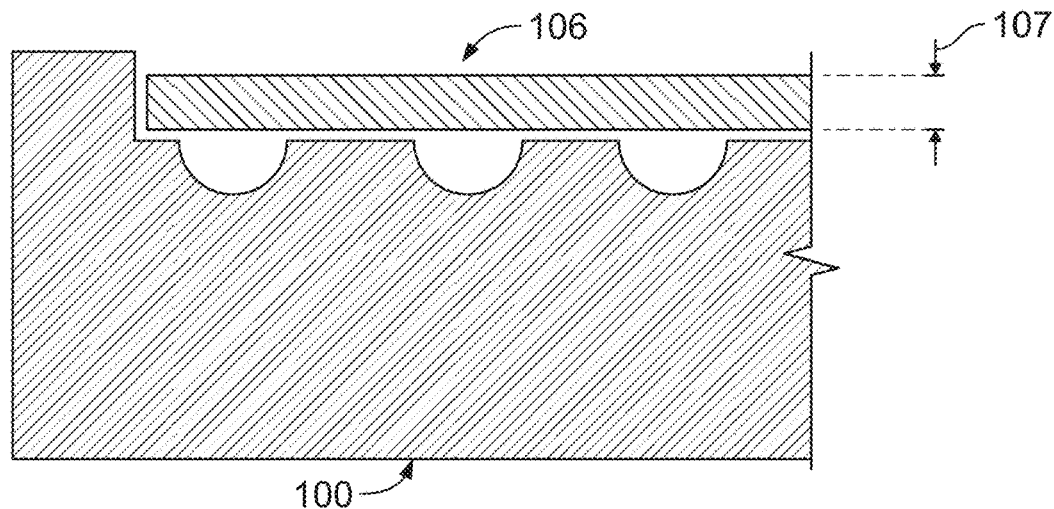
FIG. 15 is a front elevational view of the mold and a mass of material prior to heating. The material may be ink, coating, adhesive, epoxy, or other curable material.
Figure 16:
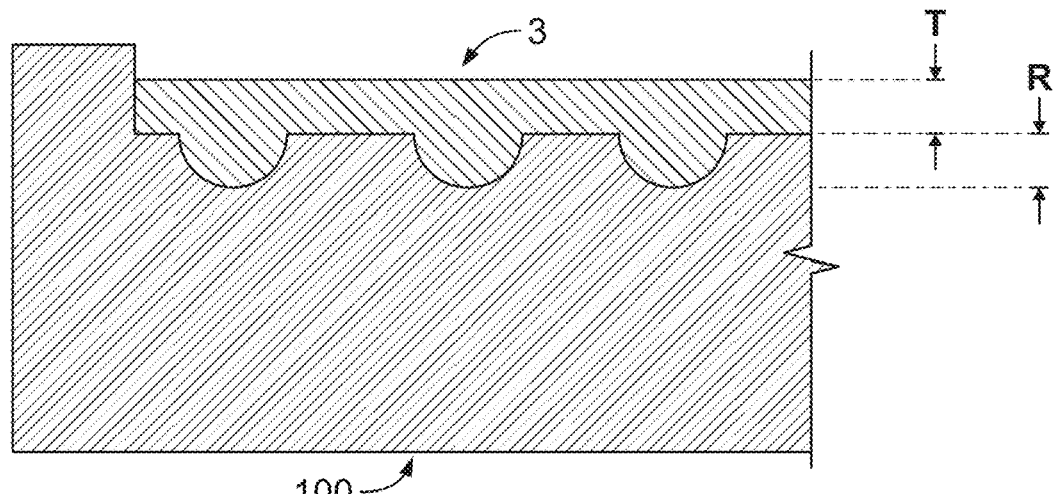
FIG. 16 is a front elevational view of the mold and the mass of polymeric material after heating.

With reference to FIG. 15, a mass of polymer 106 is placed in recessed area 102, which may be box-shaped with a thickness 107 less than thickness 106 of inner perimeter wall 105. Mass of polymer 106 is heated until mass of polymer 106 readily flows. To achieve this effect, mass of polymer 106 may be heated to a temperature slightly below its melting point (e.g., 80 to 99% of its melting point). With reference to FIG. 16, mass of polymer 106 flows into semi-circular recesses 107. Optionally, a flat press may compress mass of polymer 106 to (a) encourage flow into semi-circular recesses 107 and (b) ensure that a top surface of mass of polymer 106 (which will eventually correspond to outer surface 32) is flat and smooth. Alternatively or in addition to the press, each recess 107 may be in fluid communication with a small vacuum port or tube. When activated, a compressor, via the vacuum ports or tube, generates vacuum pressure in the recesses 107, thus drawing the polymer 106 into the recesses 107. When mass of polymer 106 cools, bottom sheet 3 is formed. Although polymer 106 has been used as an example, other materials may be used such as inks, coatings, adhesive, epoxies, or other curable materials.

Recessed area 102 need not cover the entire surface area of mold 100. As stated above, pouch 1 may be formed from a folded unity sheet. When such a sheet is desired, less than 50% of the surface area of mold 100 may be a recessed area 102 and the remaining surface area of mold 100 may be simply flat (e.g., identical to bottom wall 103).

Because bottom sheet 3 is formed via a molding process instead of via an embossing process (e.g., stretch embossing), bottom sheet 3, including microstructure 11, is integral. As a result, the non-microstructured portion of bottom sheet 3 (i.e., inner surface 21) is less likely to flex or deform with respect to microstructure 11, thus enabling bottom sheet 3 to resist wrinkling. If bottom sheet 3 were formed via embossing, bottom sheet 3 could include indentations or recesses along outer surface 32 corresponding to microstructure 11. Due to these indentations or recesses, the structural integrity of bottom sheet 3 would be impaired and bottom sheet 3 would more readily wrinkle.

Embossing, however, may be necessary in some cases and thus presents a less-preferred, but still advantageous embodiment of manufacturing pouch 1. During the embossing process, two rollers are used. The first roller is smooth and cylindrical. The second roller is cylindrical, but defines recesses 107 corresponding to microstructure (similar to mold 100 of FIG. 14 if mold 100 was arced as in a cylinder. Hot molten polymer or heated film 106 is placed into the nip between the embossed roller (which defines the microstructure) and the other smooth roller. The smooth roller applies pressure against the heated film or polymeric material 106, which forces the same into the recesses 107. Both rollers are rotated to draw unembossed polymer or film 106 toward the nip. After being deformed in the nip, the embossed film 106 bears tightly against the embossed roller. The embossed film 106 is continuously removed from the embossed roller such that no film is located on the portion of the embossed roller disposed directly before the nip. At least the embossed roller is chilled while rotating. This may be accomplished by circulating water or refrigerant through the embossed roller, returning the heated water or refrigerant from the embossed roller to a heat exchanger, cooling the heated water or refrigerant at the heat exchanger, and returning the cooled water or refrigerant to the embossed roller.

As an alternative to the above processes, an additive manufacturing system such as a 3D printer may be applied. A smooth and flat sheet may be placed before the 3D printer, which may then apply or deposit heated and at least semi-liquid material onto the smooth and flat sheet. Upon curing, the smooth and flat sheet is microstructured. Some 3D printers include curing features (e.g., UV lights or hot air blows) to accelerate curing.

FIGS. 17 to 34, and 39-41 present alternative microstructure 1701, 1901, 2101, 2301, 2501, 2701, 2901, 3101, and 3901. Any of the alternative microstructure may replace microstructure 11. Put differently, (a) features of pouch 1 discussed above or below with reference to microstructure 11 may apply to any or all of the alternative microstructure, (b) the above-discussed AMSAD ranges may apply to any or all of the alternative microstructure, and (c) the above or below discussed method of manufacturing pouch 1 may apply to any or all of the alternative microstructure. Although FIGS. 17 to 35 refer to bottom sheet 3, these Figures may, alternatively or in addition, apply to top sheet 2.

Figure 17:
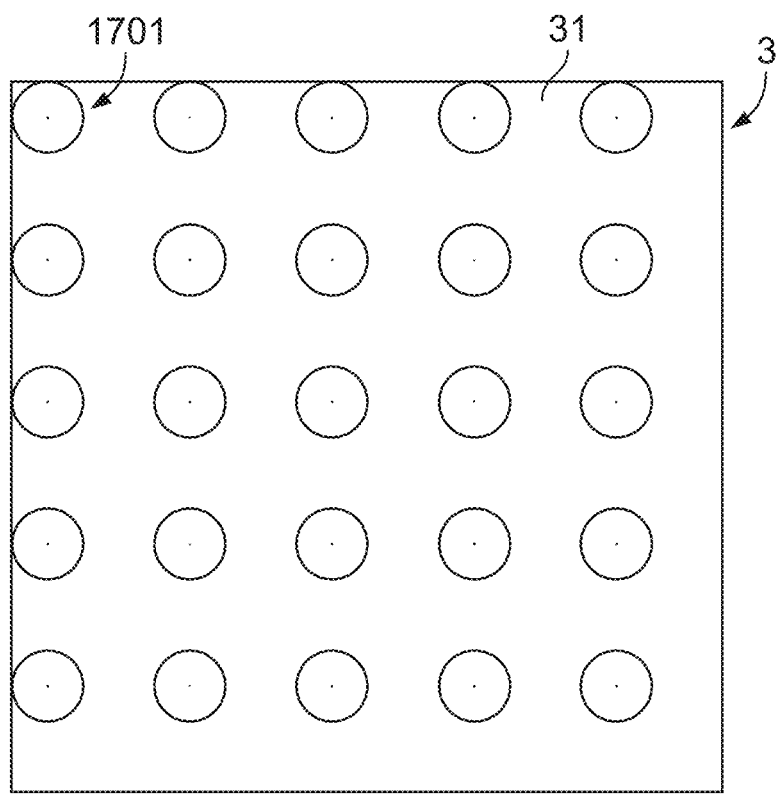
FIG. 17 is a top plan view of a sheet of any of the disclosed pouches. The sheet includes second microstructure
Figure 18:
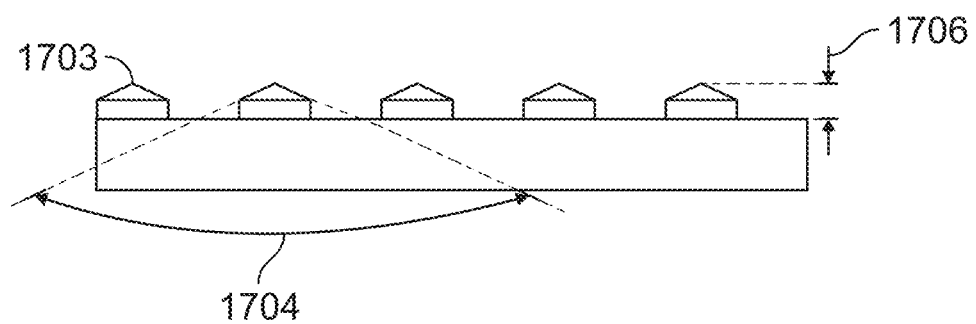
FIG. 18 is a front elevational view of the sheet of FIG. 17.

With reference to FIGS. 17 and 18, microstructure 1701 includes a base 1702 and a top 1703. Base 1702 is cylindrical. Top 1703 is conical. Top forms a tip angle 1704 of 130 degrees. A vertical height of microstructure (in the direction out of the page) is half the diameter of base 1702. Microstructure 1701 are separated by equal first and second pitches.

Figure 19:
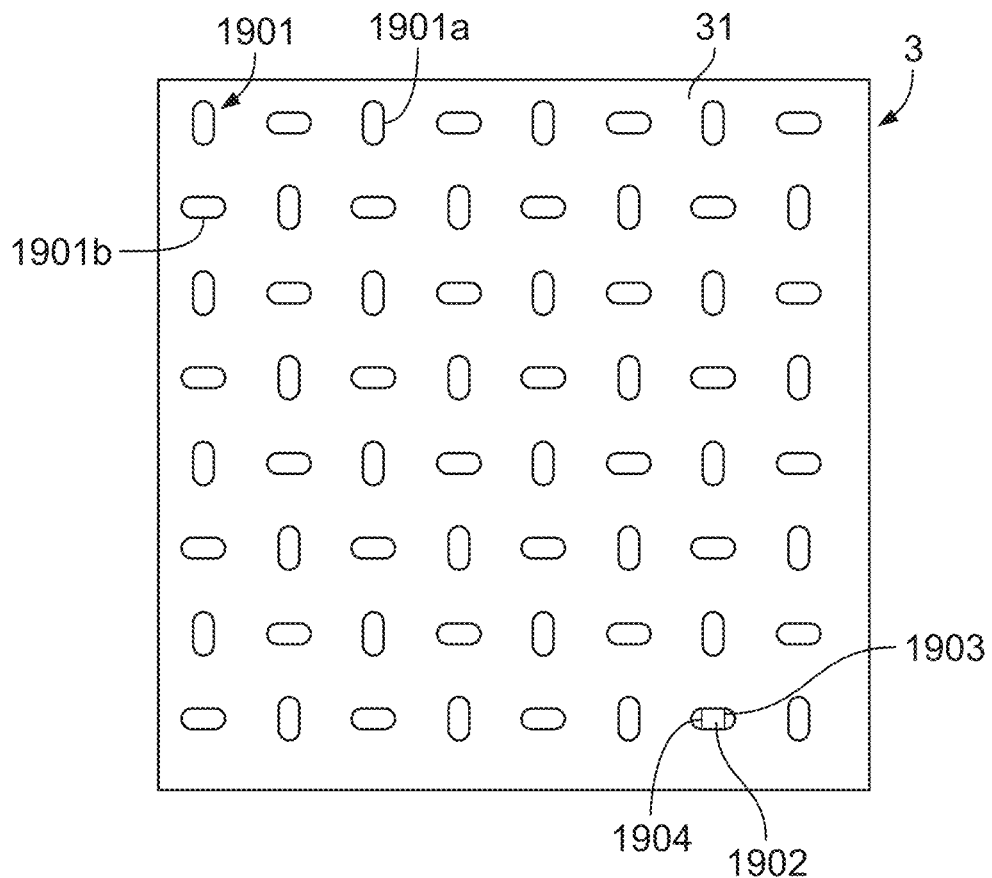
FIG. 19 is a top plan view of a sheet of any of the disclosed pouches. The sheet includes third microstructure.
Figure 20:
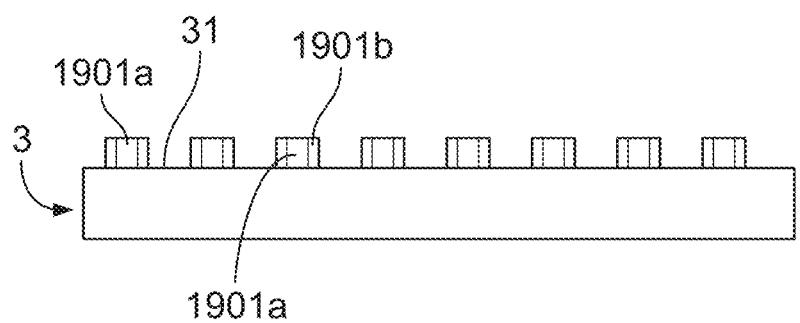
FIG. 20 is a front elevational view of the sheet of FIG. 19.

With reference to FIGS. 19 and 20, microstructure 1901 are vertically swept ovals and are thus oval-shaped. Microstructure 1901 includes longitudinal microstructure 1901*a* and transverse microstructure 1901*b*, which have identical structure but perpendicular orientations such that major axes of longitudinal microstructure 1901 extend in a direction perpendicular to major axes of transverse microstructure 1901*b*. Microstructure 1901 include a rectangular box middle 1902 and semicylindrical ends 1903, 1904. Semicylindrical ends 1903, 1904 are each half a cylinder with identical radii of curvature.

Microstructure 1901 are arrayed as shown in FIG. 19. Each row of microstructure 1901 includes longitudinal microstructure 1901a alternating with transverse microstructure 1901b. Each column of microstructure 1901 includes longitudinal microstructure 1901b alternating with transverse microstructure 1901b. Each transverse microstructure 1901b is equally spaced from the four nearest longitudinal microstructure 1901a (edge conditions excluded). Each longitudinal microstructure 1901a is equidistant from the four nearest transverse microstructure 1901b (edge conditions excluded).

Figure 21:
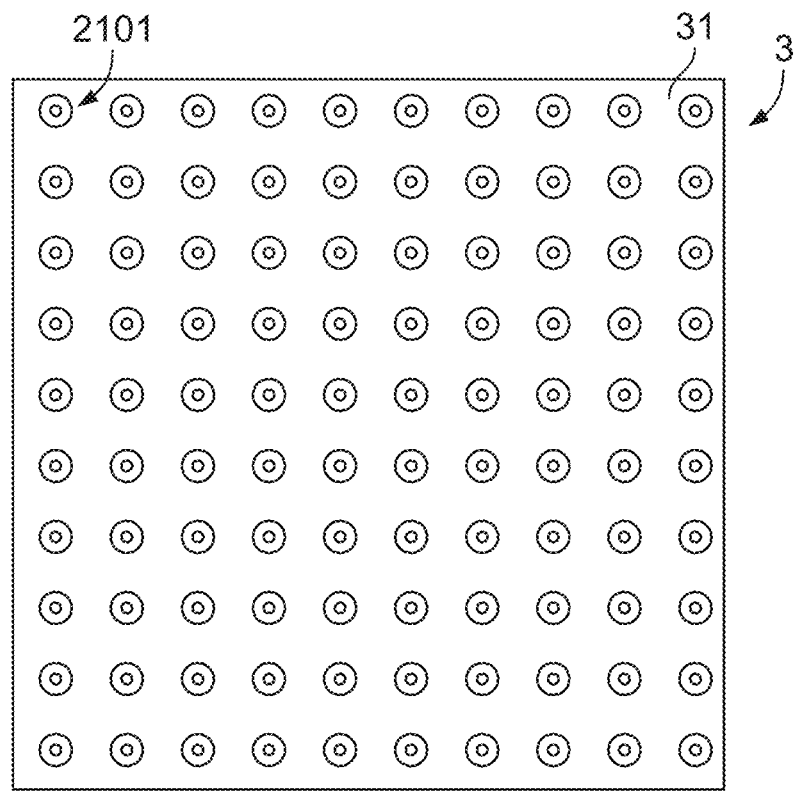
FIG. 21 is a top plan view of a sheet of any of the disclosed pouches. The sheet includes fourth microstructure.
Figure 22:
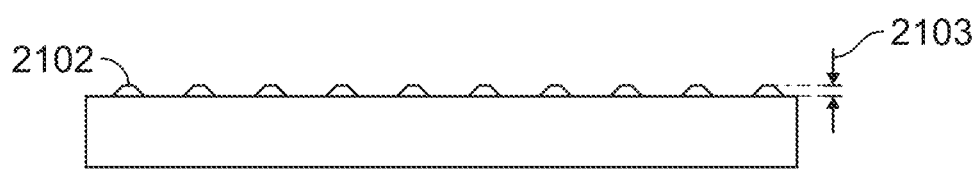
FIG. 22 is a front elevational view of the sheet of FIG. 21.

With reference to FIGS. 21 and 22, microstructure 2101 are truncated cones. A diameter of a flat upper surface 2102 is equal to a height. Contact angle A (explained with reference to FIG. 10) is 135 degrees. Microstructure 2101 are separated by equal first and second pitches.

Figure 23:
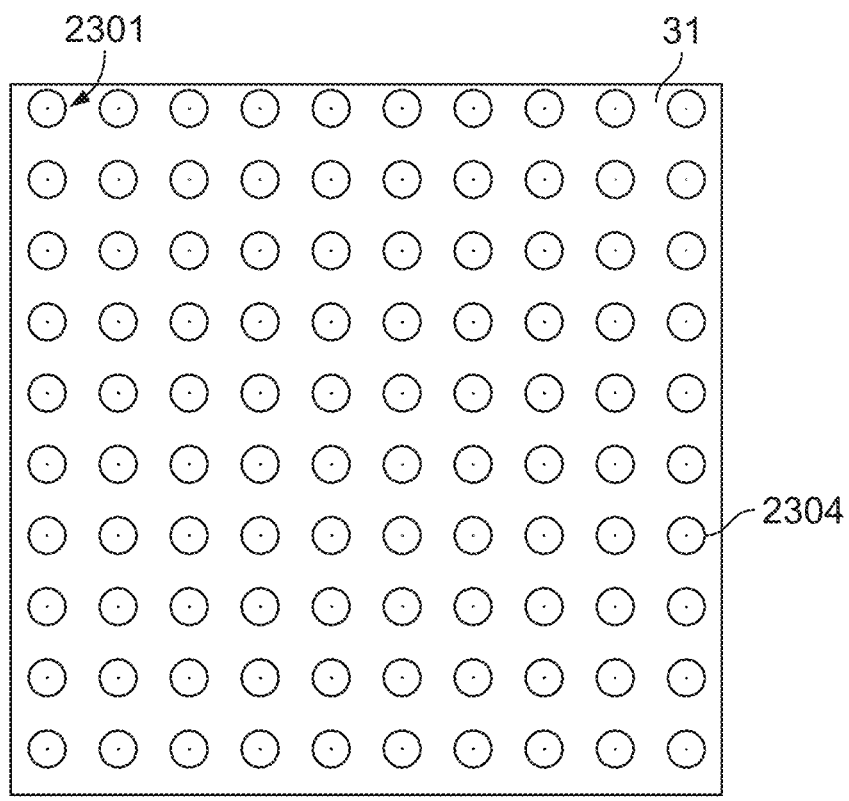
FIG. 23 is a top plan view of a sheet of any of the disclosed pouches. The sheet includes fifth microstructure.
Figure 24:
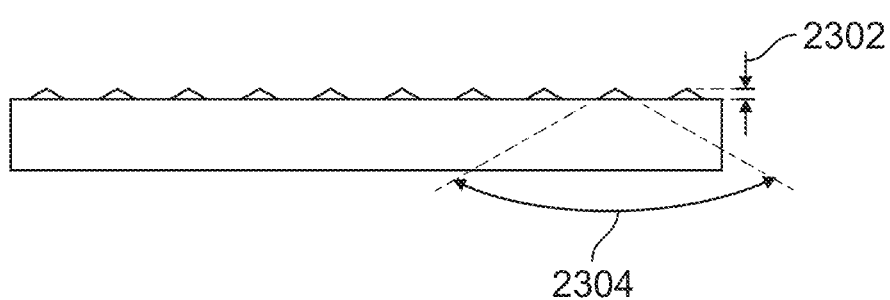
FIG. 24 is a front elevational view of the sheet of FIG. 23.

With reference to FIGS. 23 and 24, microstructure 2301 are cones with a vertical height 2302 between 25 and 28% of a base diameter 2303. A tip angle 2304 is 120 degrees. The first and second pitches are equal.

Figure 25:
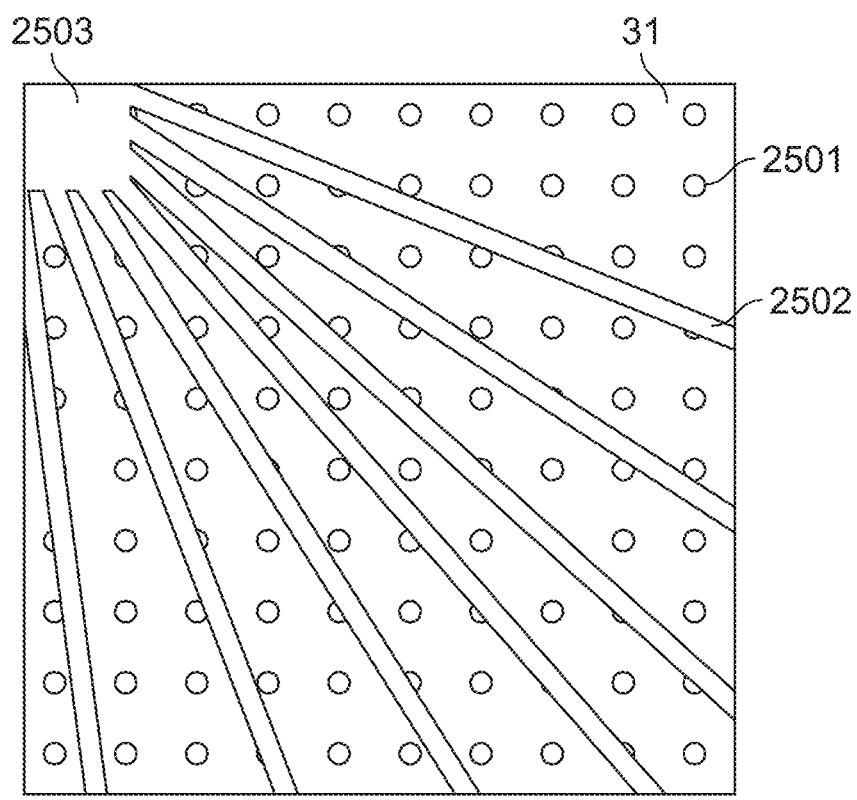
FIG. 25 is a top plan view of a sheet of any of the disclosed pouches. The sheet includes generic microstructure.
Figure 26:
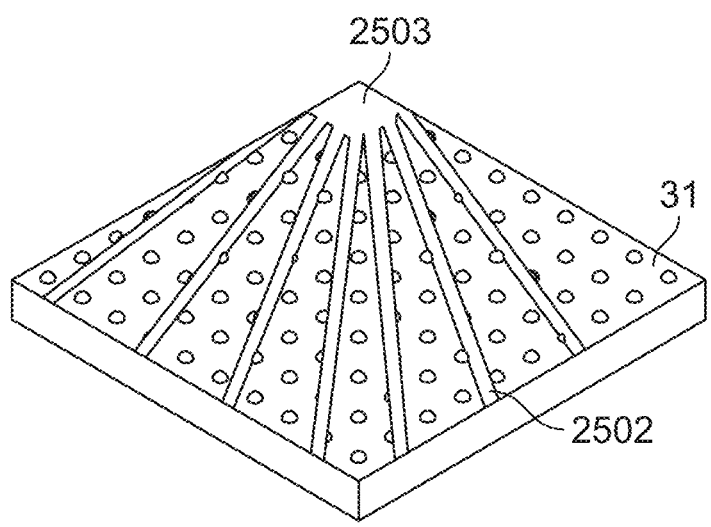
FIG. 26 is an isometric view of the sheet of FIG. 25.

With reference to FIGS. 25 and 26, generic microstructure 2501, representing any microstructure described in this application, are shown. Paths 2502 intersect at a field 2503, which is disposed directly below base 41 and/or conduit 42 of port 4 (i.e., a line perpendicular to the Z-axis in FIG. 1 and extending through any portion of base 41 and/or conduit 42 intersects field 2503). Field 2503 is shown as being rectangular (e.g., squared) but may be circular. In one example, field 2503 is positioned at an edge of the first inner surface as shown in FIGS. 25 and 26, aligned with the port 4 coupled to the outer surface. When pouch 1 includes paths 2502 and field 2503, port 4 may be disposed in a center of top sheet 2 or bottom sheet 3 and paths 2502 may extend, at regular intervals, from the complete outer perimeter of field 2503.

Advantageously, neither paths 2502 nor field 2503 are recessed into inner surface 31. Put differently, paths 2502 and field 2503 are non-microstructured portions of inner surface 31 that exclude a portion of at least one microfeature of the inner microstructure as shown in FIGS. 25 and 26. Paths 2502 are straight and may radially extend at equal intervals from field 2503.

Advantageously, neither paths 2502 nor field 2503 are recessed into inner surface 31. Put differently, paths 2502 and field 2503 are non-microstructured portions of inner surface 31. Paths 2502 are straight and may radially extend at equal intervals from field 2503.

Figure 27:
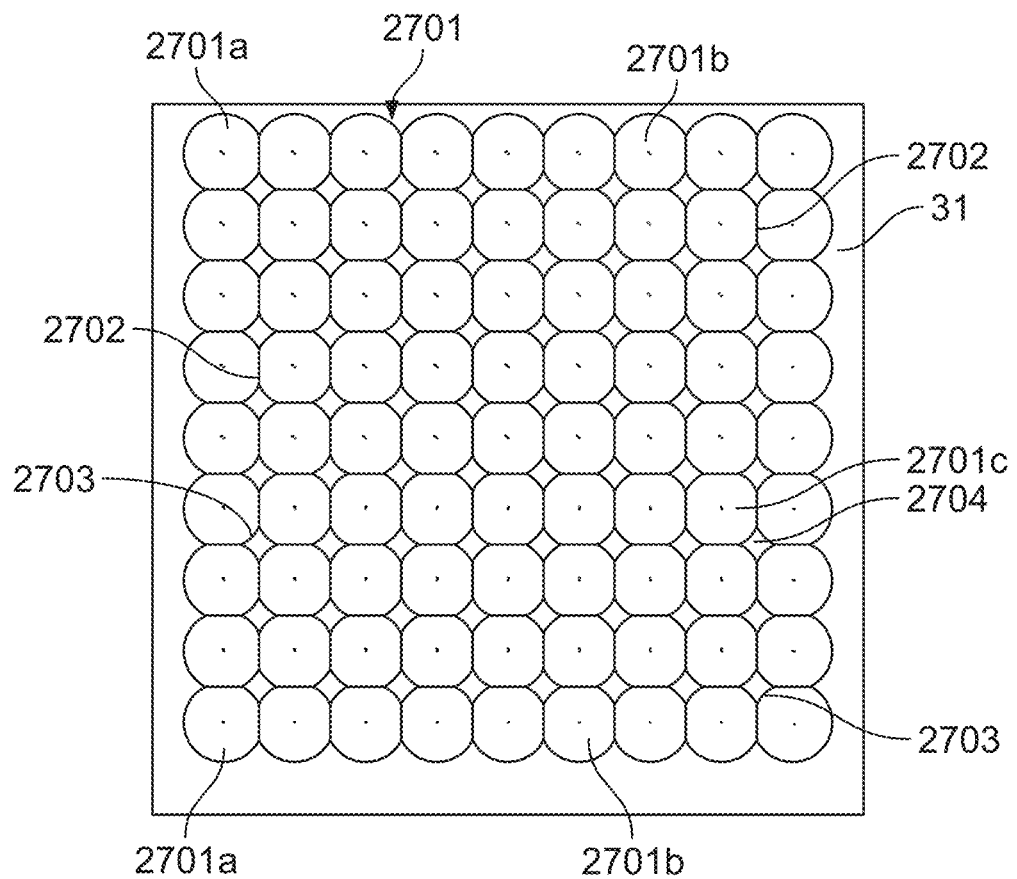
FIG. 27 is a top plan view of a sheet of any of the disclosed pouches. The sheet includes sixth microstructure.
Figure 28:
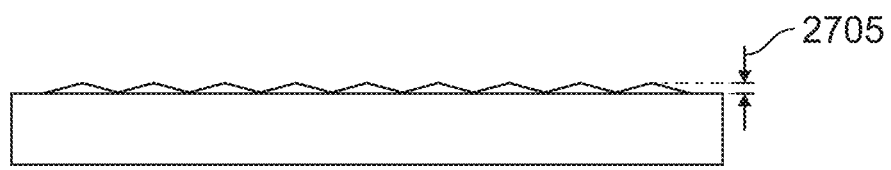
FIG. 28 is a front elevational view of the sheet of FIG. 27.

With reference to FIGS. 27 and 28, microstructure 2701 are cones with compressed bases. As such, corner microstructure 2701a include two compressed base edges 2702, side microstructure 2701b include three compressed base edges 2702, and central microstructure 2701c include four compressed base edges 2702. Compressed base arcs 2703 are formed between consecutive compressed base edges. Each compressed base arc 2703 has a compressed radius of curvature. Arced diamonds 2704 with four arced sides are defined between four compressed base arcs 2703. Arced diamonds 2704 are portions of inner surface 31. A vertical height 2705 of microstructure 2701 is fifteen percent of the first pitch, which is equal to the second pitch.

Figure 29:
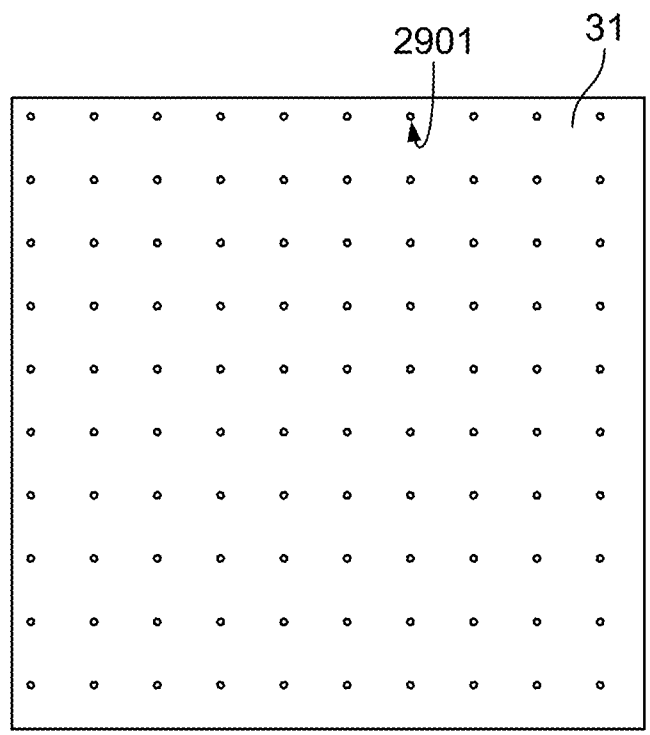
FIG. 29 is a top plan view of a sheet of any of the disclosed pouches. The sheet includes seventh microstructure.
Figure 30:
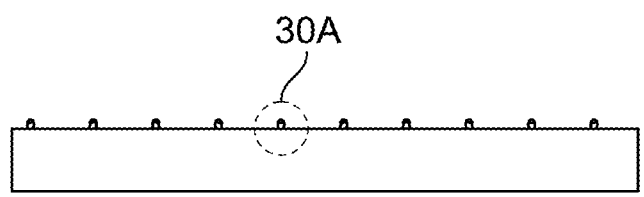
FIG. 30 is a front elevational view of the sheet of FIG. 29.
Figure 30:
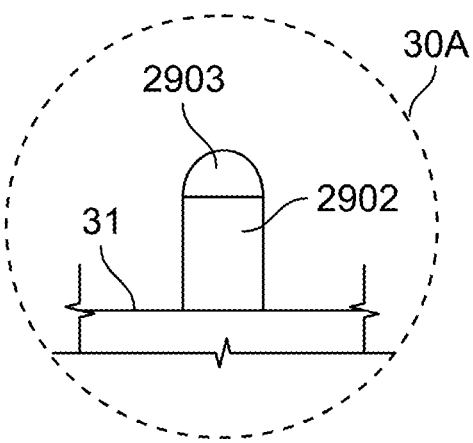
Figure 31:
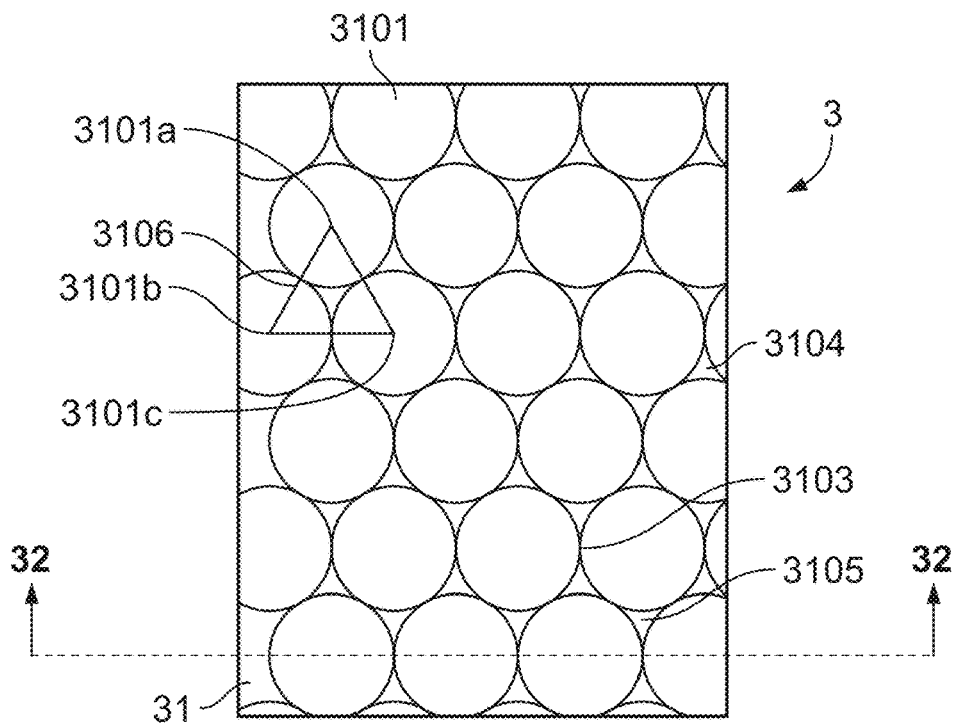
FIG. 31 is a top plan view of a sheet of any of the disclosed pouches. The sheet includes eighth microstructure.
Figure 32:
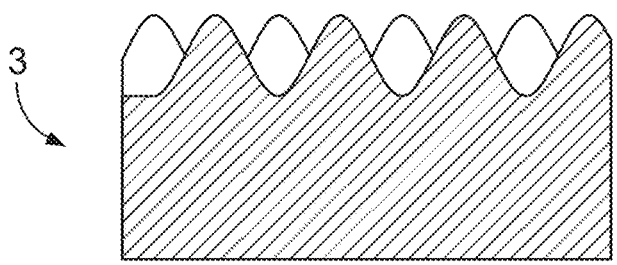
FIG. 32 is a front cross-sectional view of the sheet of FIG. 31 taken along line 32-32 of FIG. 31.
Figure 33:
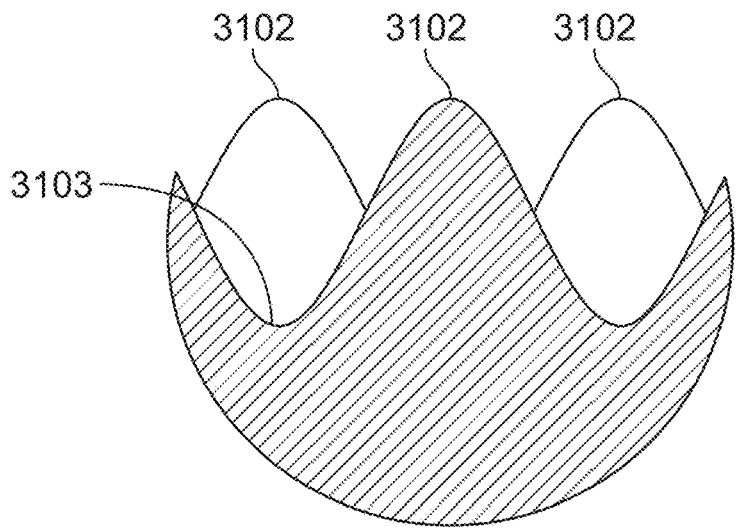
FIG. 33 is an enlarged portion of FIG. 32.
Figure 34:
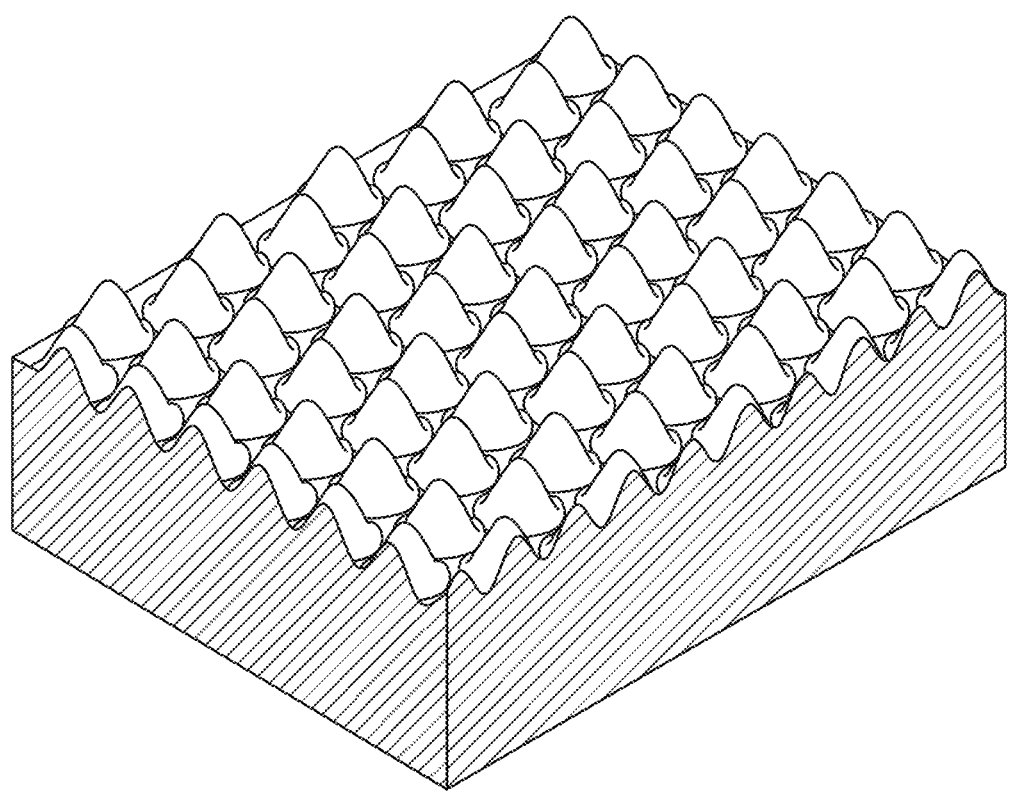
FIG. 34 is an isometric view of the sheet of FIG. 31.

With reference to FIGS. 29 and 30, microstructure 2901 include a cylindrical base 2902 and a semispherical tip 2903. A maximum radius of semispherical tip 2903 is equal to a radius of cylindrical base 2902. A vertical height of cylindrical base 2902 is equal to twice the radius of semispherical tip 2903. The first pitch is equal to the second pitch, which are both more than five, ten, and fifteen times greater than the radius of spherical tip 2903.

With reference to FIGS. 31 to 34, sinusoidal microstructure 3101 is conical and triangularly arrayed such that a group of three adjacent microstructure 3101a, 3101b, 3101c define an equilateral triangle 3106 through their respective centers. Microstructure 3101 include sinusoidal peaks 3102 and are separated by sinusoidal valleys 3103. Outer surfaces of adjacent microstructure define arced triangles 3105 having three arced sides. Arced triangles 3105 are portions of flat inner surface 31.

Figure 39:
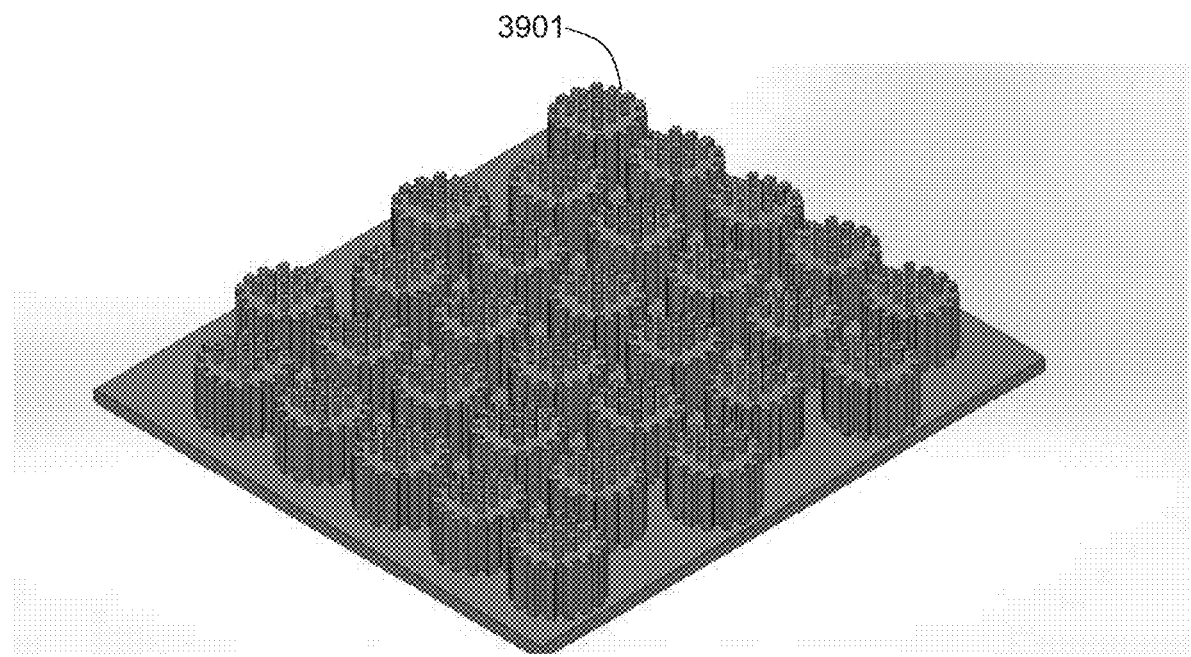
FIG. 39 is a perspective view of a sheet of any of the disclosed pouches. The sheet includes ninth microstructure.
Figure 40:
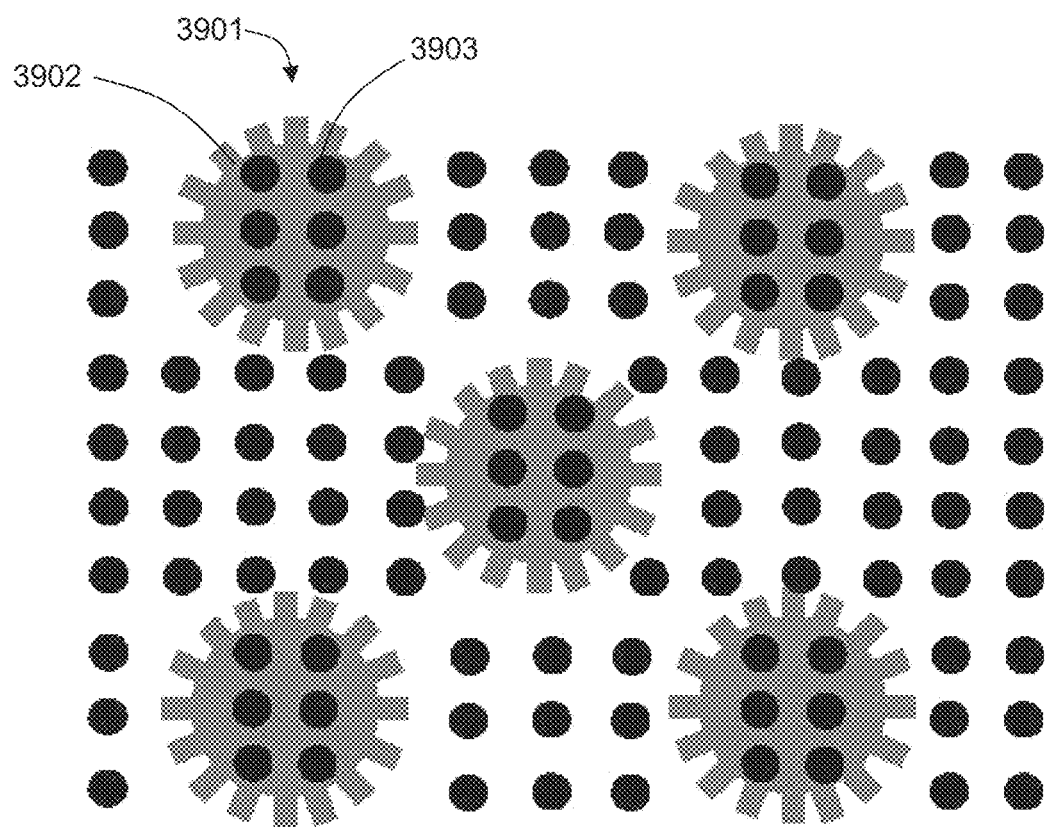
FIG. 40 is a top plan view of the microstructure of FIG. 39.
Figure 41:
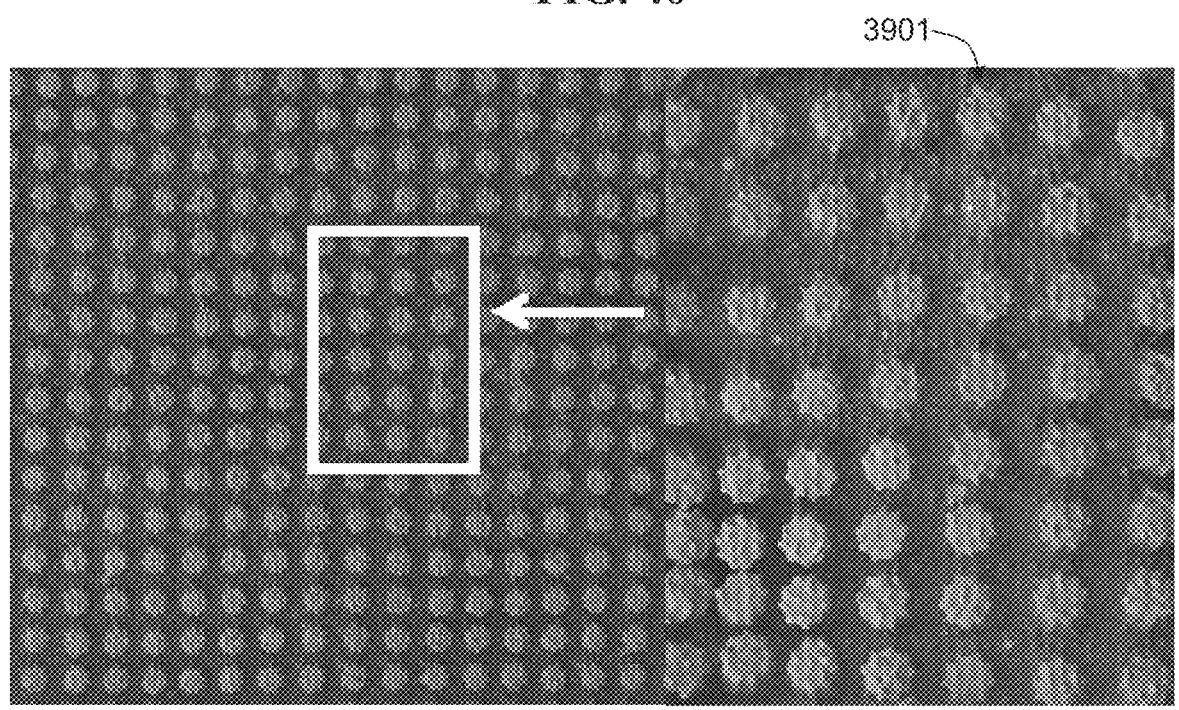
FIG. 41 is another top plan view of the microstructure of FIG. 39.

With reference to FIGS. 39-41, microstructure 3901 is generally circular with protruding members on a top side. Microstructure 3901 include a main body 3902, having protruding members 3903. In some examples, a substrate on which microstructure 3901 is structures may include protruding members 3903 as well.

Figure 35:
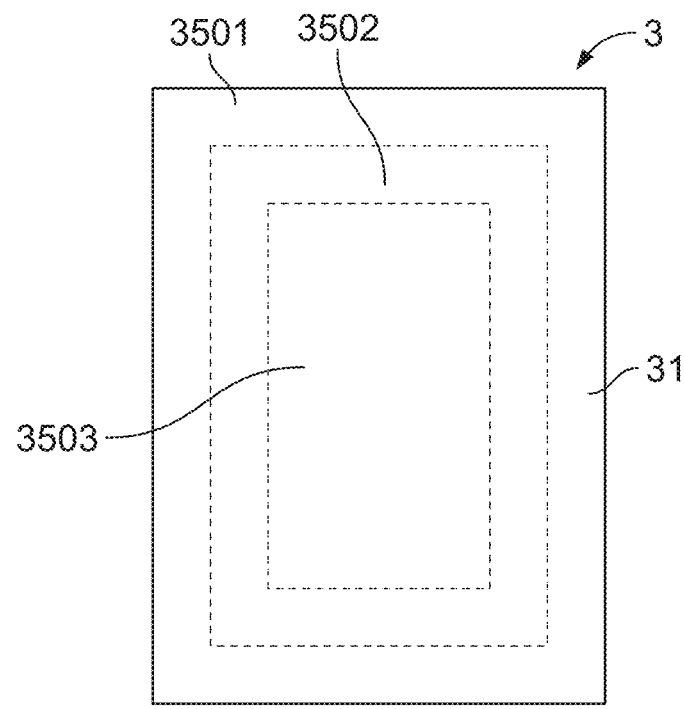
FIG. 35 is a top plan view of a sheet of any of the disclosed pouches.

As shown in FIG. 35, bottom sheet 3 may include a plurality of different concentric microstructure 3501, 3502, 3503, which may be circular, rectangular, etc. First or outer microstructure 3501 may be any of the above-discussed microstructure 11, 1701, 1901, 2101, 2301, 2501, 2701, 2901, 3101. Second or intermediate microstructure 3502 may be any of the above-discussed microstructure 11, 1701, 1901, 2101, 2301, 2501, 2701, 2901, 3101. Third or inner microstructure 3503 may be any of the above-discussed microstructure 11, 1701, 1901, 2101, 2301, 2501, 2701, 2901, 3101. First, second, and third microstructure 11 are non-overlapping.

Figure 36:
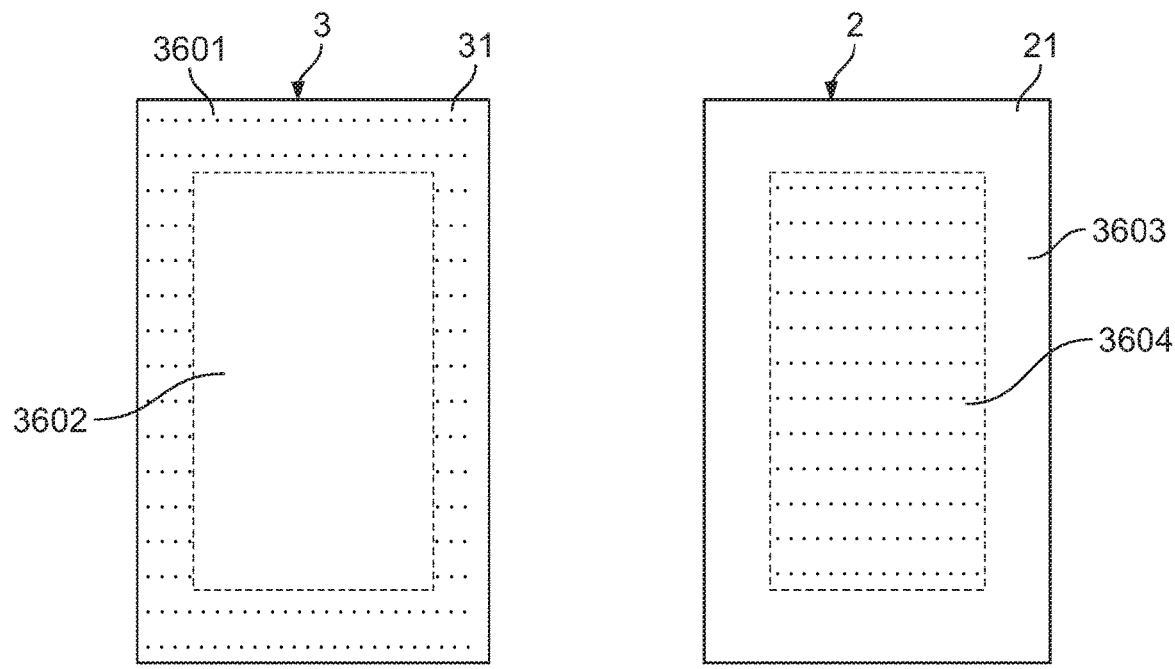
FIG. 36 is a top plan view of complementary sheets of any of the disclosed pouches.

As shown in FIG. 36, top sheet 2 and bottom sheet 3 may both include microstructure, arranged in complementing arrays such that when top sheet 2 and bottom sheet 3 lie flat against each other (e.g., when pouch 1 is fully evacuated), microstructure of top sheet 2 does not contact microstructure of bottom sheet 3. When top sheet 2 and bottom sheet 3 lie flat against each other, microstructure may span the entire surface area of pouch 11 or only a portion thereof. Manufacturing of complementary top and bottom sheets 2, 3 may be accomplished by applying above-discussed manufacturing techniques to both top and bottom sheets 2, 3. The microstructure may be one or more of the above-discussed microstructure 11, 1701, 1901, 2101, 2301, 2501, 2701, 2901, 3101, 3901.

Figure 38:
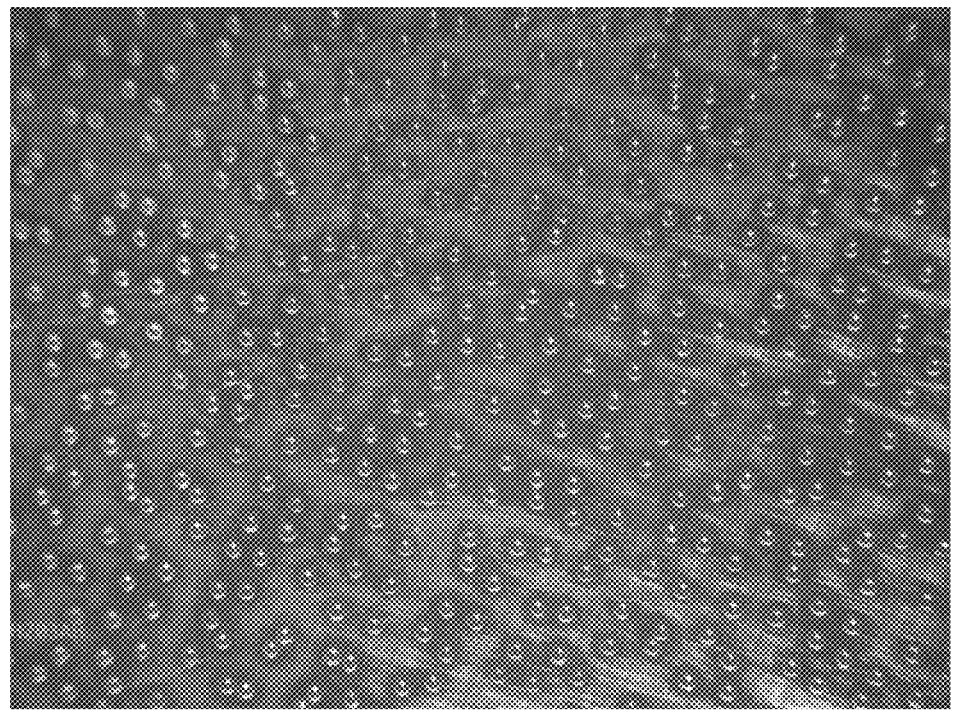
FIG. 38 is a top plan view of a random arrangement of microstructures.

For example, outer area 3601 of bottom sheet 3 may be microstructured (with any of the above-discussed microstructure) while inner area 3602 is non-microstructured. At the same time, outer area 3603 of top sheet 2 may be non-microstructured, while inner area 3604 is microstructured (with any of the above-discussed microstructure). The outer area 3601 and inner area 3604 may have different microstructure shapes (e.g., any of the above discussed microstructure shapes), as well as densities (e.g., any of the above discussed microstructure dimensions, spacing, etc.) This arrangement of microstructured areas is only one example, and it should be appreciated that the opposite may be present instead (where only inner area 3602 of bottom sheet 3 is microstructured and only outer area 3603 of top sheet 2 is microstructured). FIG. 36 shows the first inner surface 31 with an outer microstructured area 3601 that extends around the perimeter of the first inner surface 31, and an inner rectangular non-microstructured area 3602. The second inner surface 21 has an outer non-microstructured area 3604 that extends around the perimeter of the second inner surface 21, and an inner rectangular microstructured area 3604. The arrays are not limited to the rectangular shapes shown below and may be any suitable shape (e.g., circular). The arrays may include random or scattered placements microstructure such that within the microstructured area of the sheet, the locations of the microstructure do not observe any discernible pattern. A schematic of randomized microstructure placement is shown in FIG. 38.

As a similar example, only one of outer area 3601 and inner area 3602 of bottom sheet 3 includes microstructure 11, and only one of outer area 3603 and inner area 3604 of top sheet 2 includes microstructure, bottom sheet 3 and top sheet 2 being arranged and/or configured to complement each other (as previously discussed, to prevent overlap between microstructure 11 of bottom sheet 3 with microstructure 11 of top sheet 2).

Although the above examples show top and bottom sheets 2, 3 only being segmented into two different areas (an inner or outer microstructured area and an outer or inner nonmicrostructured area), top and bottom sheets 2, 3 may be segmented into any number of different areas (e.g., 3, 4, 5 different areas).

Figure 37:
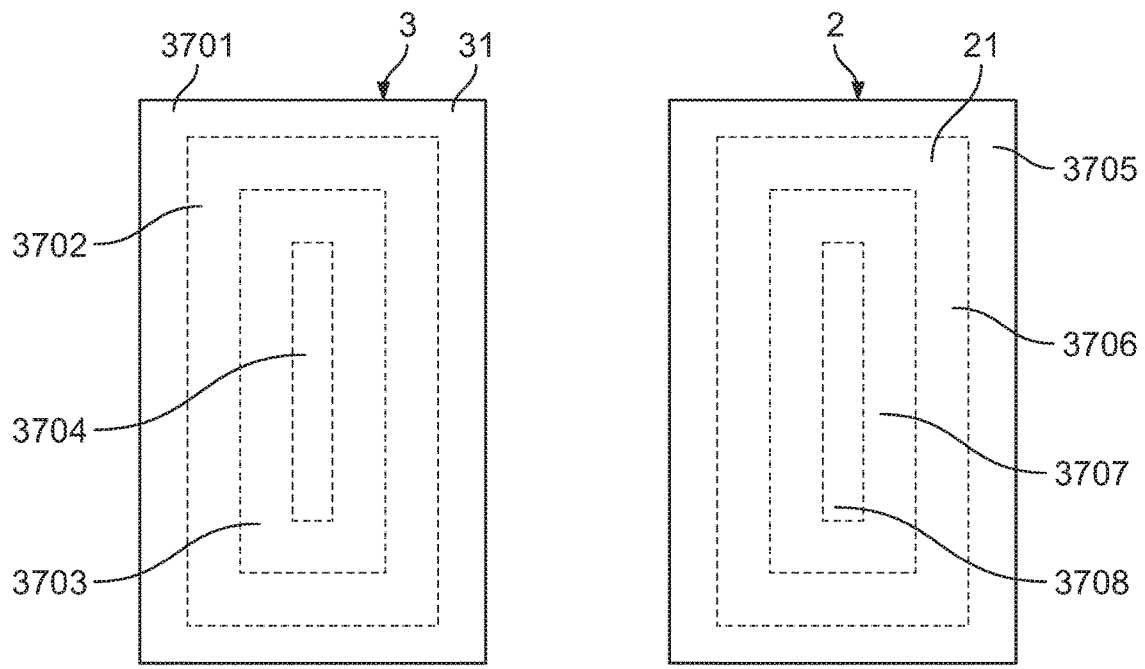
FIG. 37 is a top plan view of complementary sheets of any of the disclosed pouches.

For example, with reference to FIG. 37, outer areas 3701, 3705 of both top and bottom sheets 2, 3 may be nonmicrostructured or only one of outer areas 3701, 3705 may be microstructured. First intermediate area 3702 and inner area 3704 of bottom sheet 3 may be microstructured while second intermediate area 3703 is nonmicrostructured. Top sheet 2 may complement bottom sheet 3. Thus, some or all of top sheet 2 may be nonmicrostructured. As one example, first intermediate area 3706 and inner area 3708 may be nonmicrostructured while second intermediate area 3707 is microstructured. Thus, pouch 1 is configured such that when bottom sheet 3 lies against top sheet 2, microstructure will not overlap or contact.

A flexible container (e.g., a pouch) for holding fluid is thus disclosed. The flexible container may comprise, consistent essentially of, or consist of: (a) a first sheet defining a first inner body and a first outer surface, the first inner body defining a first inner surface and inner microstructure extending from the first inner surface, the first inner body defining an aerial microstructure surface area density (AMSAD) between 5% and 15%, the AMSAD being defined as a total surface area of the microstructure, when viewed from a top plan perspective, divided by a total surface area of the inner body, when viewed from a top plan perspective; (b) a second sheet defining a second inner surface and a second outer surface, the second sheet being joined with the first sheet such that the first inner body and the second inner surface at least partially define an air-tight fluid chamber therebetween, the second sheet lacking microstructure extending from the second inner surface. The first inner surface, the first outer surface, the second inner surface, and the second outer surface are smooth and non-recessed.

A method of manufacturing a fluid pouch (i.e., a flexible container) is thus disclosed, the method comprising: (a) producing a first polymeric sheet comprising a first inner body and a flat and smooth first outer surface, the first inner body comprising a flat and smooth first inner surface and semi-spherical microstructure, (b) heating a perimeter of the first polymeric sheet to join the perimeter of the first polymeric sheet with a second polymeric sheet, the second polymeric sheet comprising a flat and smooth second inner surface and a flat and smooth second outer surface.

The step of producing the first polymeric sheet may comprise: (i) placing a mass of polymeric material into a mold, the mold defining a plurality of semi-spherical recesses arranged in an array; (ii) heating the mass of polymeric material, in the mold, at least until the mass of polymeric material flows into the semi-spherical recesses; (iii) cooling the mass polymeric material and removing the cooled mass of polymeric material from the mold. During the step of heating the perimeter of the first polymeric sheet, the semi-spherical microstructure of the first polymeric sheet may face the second inner surface of the second polymeric sheet. The second polymeric sheet may be non-microstructured. The mold may not include side-walls and thus the cooled polymeric sheet may be trimmed to the desired shape.

We claim:

1. A flexible container for holding fluid, the flexible container comprising:
   a first sheet comprising a first inner body and a first outer surface, the first inner body comprising:
      a first inner surface having:
         an outer microstructured area that extends around at least a portion of the perimeter of the first inner surface; and
         an inner rectangular non-microstructured area; and
      a first inner microstructure extending from the outer microstructured area of the first inner surface;
   a second sheet comprising a second inner body and a second outer surface, the second inner body comprising:
      a second inner surface having:
         an inner rectangular microstructured area; and
         an outer non-microstructured area that extends around at least a portion of the perimeter of the second inner surface; and
      a second inner microstructure extending from the inner rectangular microstructured area of the second inner surface,
   wherein:
      (i) the second sheet is joined with the first sheet such that the first inner body and the second inner body at least partially define an air-tight fluid chamber therebetween,
      (ii) the outer microstructured area of the first inner surface and the inner microstructured area of the second inner surface are complementary, such that when the first sheet and second sheet are joined: (a) the outer microstructured area of the first inner surface aligns with the outer non-microstructured area of the second inner surface, and (b) the inner non-microstructured area of the first inner surface aligns with the inner microstructured area of the second inner surface,
      (iii) a shape of the first inner microstructure is different from a shape of the second inner microstructure, and
      (iv) the first inner surface, the first outer surface, the second inner surface, and the second outer surface are smooth and non-recessed.

2. The flexible container of claim 1, wherein the outer microstructured area of the first inner surface comprises a rectangular shape extending inward from an outer edge of the first sheet, and wherein the inner rectangular microstructured area of the second inner surface comprises a rectangular shape including a center of the second sheet.

3. A flexible container for holding fluid, the flexible container comprising:
   a first sheet comprising a first inner body and a first outer surface, the first inner body comprising:
      a first inner surface having:
         an outer microstructured area that extends around at least a portion of the perimeter of the first inner surface; and
         an inner rectangular non-microstructured area; and
      a first inner microstructure extending from the outer microstructured area of the first inner surface;

a second sheet comprising a second inner body and a second outer surface, the second inner body comprising:
   a second inner surface having:
      an inner rectangular microstructured area; and
      an outer non-microstructured area that extends around at least a portion of the perimeter of the second inner surface; and
   a second inner microstructure extending from the inner rectangular microstructured area of the second inner surface,
wherein:
   (i) the second sheet is joined with the first sheet such that the first inner body and the second inner body at least partially define an air-tight fluid chamber therebetween,
   (ii) the outer microstructured area of the first inner surface and the inner microstructured area of the second inner surface are complementary, such that when the first sheet and second sheet are joined: (a) the outer microstructured area of the first inner surface aligns with the outer non-microstructured area of the second inner surface, and (b) the inner non-microstructured area of the first inner surface aligns with the inner microstructured area of the second inner surface,
   (iii) a density of the first inner microstructure is different from a density of the second inner microstructure, and
   (iv) the first inner surface, the first outer surface, the second inner surface, and the second outer surface are smooth and non-recessed.

4. The flexible container of claim 3, wherein the outer microstructured area of the first inner surface comprises a rectangular shape extending inward from an outer edge of the first sheet, and wherein the inner rectangular microstructured area of the second inner surface comprises a rectangular shape including a center of the second sheet.

* * * * *